United States Patent
Fujimoto et al.

(10) Patent No.: US 10,466,756 B2
(45) Date of Patent: Nov. 5, 2019

(54) HOST APPARATUS AND EXPANSION DEVICE ADAPTABLE TO LOW VOLTAGE SIGNALING

(71) Applicant: TOSHIBA MEMORY CORPORATION, Minato-ku (JP)

(72) Inventors: Akihisa Fujimoto, Yamato (JP); Hiroyuki Sakamoto, Ome (JP); Shinji Honjo, Arakawa (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 15/325,486

(22) PCT Filed: Apr. 14, 2015

(86) PCT No.: PCT/JP2015/061922
§ 371 (c)(1),
(2) Date: Jan. 11, 2017

(87) PCT Pub. No.: WO2016/009692
PCT Pub. Date: Jan. 21, 2016

(65) Prior Publication Data
US 2017/0192475 A1    Jul. 6, 2017

(30) Foreign Application Priority Data

Jul. 15, 2014 (JP) .................................. 2014-145393
Jan. 19, 2015 (JP) .................................. 2015-008003

(51) Int. Cl.
*G06F 13/20* (2006.01)
*G06F 1/26* (2006.01)
(Continued)

(52) U.S. Cl.
CPC ............ *G06F 1/266* (2013.01); *G06F 1/3287* (2013.01); *G06F 1/3296* (2013.01); *G06F 3/061* (2013.01);
(Continued)

(58) Field of Classification Search
CPC .... G06F 1/266; G06F 13/4282; G06F 1/3287; G06F 3/061; G06F 3/0659; G06F 3/067;
(Continued)

(56) References Cited

U.S. PATENT DOCUMENTS 7,353,993 B2    4/2008    Fujimoto
7,549,580 B2    6/2009    Fujimoto
(Continued)

FOREIGN PATENT DOCUMENTS

CN    101910972 A    12/2010
EP    1 816 590 A1    8/2007
(Continued)

OTHER PUBLICATIONS

International Search Report and Written Opinion dated Oct. 30, 2015 in PCT/JP2015/061922 filed Apr. 14, 2015.
(Continued)

*Primary Examiner* — Jing-Yih Shyu
(74) *Attorney, Agent, or Firm* — Oblon, McClelland, Maier & Neustadt, L.L.P.

(57) ABSTRACT

An expansion device includes a clock swing detecting unit, a command receiving unit, and a response generating unit. The clock swing detecting unit detects a clock swing set based on a second signal voltage lower than a first signal voltage before the start of initialization. The command receiving unit receives a command having a parameter incorporated that can indicate which signal voltage of the
(Continued)

first signal voltage and second signal voltage is being used. The response generating unit responds to the command based on the clock swing.

20 Claims, 23 Drawing Sheets

(51) Int. Cl.
G06F 1/3287 (2019.01)
G06F 1/3296 (2019.01)
G06F 3/06 (2006.01)
G06F 13/40 (2006.01)
G06F 13/42 (2006.01)

(52) U.S. Cl.
CPC ............ *G06F 3/067* (2013.01); *G06F 3/0659* (2013.01); *G06F 13/4022* (2013.01); *G06F 13/4282* (2013.01); *Y02D 10/14* (2018.01); *Y02D 10/151* (2018.01)

(58) Field of Classification Search
CPC ...... G06F 13/4022; G06F 1/3296; G06F 3/00; Y02D 10/151; Y02D 10/14
See application file for complete search history.

(56) References Cited

U.S. PATENT DOCUMENTS

| | | |
|---|---|---|
| 7,810,727 B2 | 10/2010 | Fujimoto |
| 7,864,615 B2 | 1/2011 | Chen et al. |
| 7,891,566 B2 | 2/2011 | Fujimoto |
| 8,067,861 B2 | 11/2011 | Toyama et al. |
| 8,162,216 B2 | 4/2012 | Fujimoto |
| 8,207,638 B2 | 6/2012 | Toyama et al. |
| 8,212,429 B2 | 7/2012 | Toyama et al. |
| 8,286,874 B2 | 10/2012 | Fujimoto |
| 8,321,697 B2 | 11/2012 | Fujimoto |
| 8,397,990 B2 | 3/2013 | Fujimoto |
| 8,596,548 B2 | 12/2013 | Fujimoto |
| 8,799,689 B2 | 8/2014 | Fujimoto |
| 8,827,167 B2 | 9/2014 | Fujimoto |
| 9,052,843 B2 | 6/2015 | Fujimoto |
| 9,141,398 B2 * | 9/2015 | Fujimoto ............... G06F 9/4405 |
| 9,383,792 B2 | 7/2016 | Fujimoto |
| 9,417,798 B2 | 8/2016 | Fujimoto |
| 2007/0051806 A1 | 3/2007 | Fujimoto |
| 2008/0049510 A1 | 2/2008 | Chen et al. |
| 2008/0149715 A1 | 6/2008 | Fujimoto |
| 2009/0224042 A1 | 9/2009 | Fujimoto |
| 2010/0264753 A1 * | 10/2010 | Toyama ................... G06F 1/26 307/130 |
| 2010/0268873 A1 | 10/2010 | Chen et al. |
| 2010/0322017 A1 | 12/2010 | Fujimoto |
| 2011/0022789 A1 * | 1/2011 | Fujimoto ................ G06F 1/266 711/103 |
| 2011/0114737 A1 | 5/2011 | Fujimoto |
| 2012/0032528 A1 | 2/2012 | Toyama et al. |
| 2012/0033717 A1 | 2/2012 | Toyama et al. |
| 2012/0176855 A1 | 7/2012 | Fujimoto |
| 2012/0254600 A1 | 10/2012 | Fujimoto |
| 2013/0013882 A1 | 1/2013 | Fujimoto |
| 2013/0060995 A1 | 3/2013 | Fujimoto |
| 2013/0166843 A1 | 6/2013 | Fujimoto |
| 2014/0068111 A1 | 3/2014 | Fujimoto |
| 2014/0244878 A1 * | 8/2014 | Miller ................... G06F 13/409 710/300 |
| 2014/0304533 A1 | 10/2014 | Fujimoto |
| 2014/0351514 A1 | 11/2014 | Fujimoto |
| 2015/0234596 A1 | 8/2015 | Fujimoto |

FOREIGN PATENT DOCUMENTS

| | | |
|---|---|---|
| EP | 2 249 227 A1 | 11/2010 |
| JP | 2009-258773 A | 11/2009 |
| JP | 4620049 B2 | 1/2011 |
| WO | 2006/057340 A1 | 6/2006 |
| WO | 2011/074708 A1 | 6/2011 |

OTHER PUBLICATIONS

Taiwanese Examination Report dated May 20, 2016 in Taiwanese Application 104111990 (with English translation).

* cited by examiner

| 47 | 46 | 45:40 | 39:20 | 19:16 | 15:08 | 07:01 | 00 |
|---|---|---|---|---|---|---|---|
| S | T | Index | Reserved | VHS | Check Pattern | CRC7 | E |
| 0 | 1 | 010100b | 00000h | xxxxb | xxh | xx | 1 |

Voltage Host Supplied
0000b: Not Defined
0001b: VDD:2.7V-3.6V, 3.3V signaling
0010b: VDD:2.7V-3.6V, 1.8V signaling
0100b: Reserved
1000b: Reserved
Others: Not Defined

Check Pattern
10101010b: VDD: 3.3V Rage, 3.3V Signaling
10100101b: VDD: 3.3V Rage, 1.8V Signaling

| SD HOST | SD CARD | | | | |
|---|---|---|---|---|---|
| | Non UHS | UHS-I | LVS UHS-I | UHS-II | LVS UHS-II |
| Non UHS | HVS | HVS | HVS | HVS | HVS |
| UHS-I | HVS | HVS to LVS | HVS to LVS | HVS to LVS | HVS to LVS |
| UHS-II | HVS | HV to LV | HV to LV | LVDS | LVDS |
| LVS UHS-I | N/A | N/A | LVS | N/A | LVS |
| LVS UHS-II | N/A | N/A | LVS | LVDS | LVDS |

FIG.12

| 47 | 46 | 45:40 | 39:20 | 19:16 | 15:08 | 07:01 | 00 |
|---|---|---|---|---|---|---|---|
| S | T | Index | Reserved | VHS | Check Pattern | CRC7 | E |
| 0 | 1 | 010100b | 00000h | xxxxb | xxh | xx | 1 |

Check Pattern
10101010b: VDD1: 3.3V Rage, 3.3V Signaling
10100101b: VDD1: 3.3V Rage, 1.8V Signaling
01010101b: VDD1: 1.8V Rage, 1.8V Signaling

Voltage Host Supplied
0000b: Not Defined
0001b: VDD1: 2.7V-3.6V, 3.3V Signaling
0010b: VDD1: 2.7V-3.6V, 1.8V Signaling
0100b: VDD1: 1.95V-1.65V, 1.8V Signaling
1000b: Reserved
Others: Not Defined

FIG.14

| HOST | 3.3V POWER SUP VDD CARD | | 1.8V POWER SUP VDD CARD | |
|---|---|---|---|---|
| Signal | LVS UHS-I | LVS UHS-II | 1.8V LVS UHS-I | 1.8V LVS UHS-II |
| 3.3V POWER SUP LVS UHS-I | LVS | LVS | N/A | N/A |
| 1.8V POWER SUP LVS UHS-I | N/A | N/A | LVS | LVS |
| 3.3V POWER SUP LVS UHS-II | LVS | LVDS | N/A | N/A |
| 1.8V POWER SUP LVS UHS-II | N/A | N/A | LVS | LVDS |

HOST APPARATUS AND EXPANSION DEVICE ADAPTABLE TO LOW VOLTAGE SIGNALING

CROSS-REFERENCE TO RELATED APPLICATIONS

This application is based upon and claims the benefit of priority from Japanese Patent Application No. 2014-145393, filed on Jul. 15, 2014 and Japanese Patent Application No. 2015-8003, filed on Jan. 19, 2015; the entire contents of which are incorporated herein by reference.

FIELD

Embodiments described herein relate generally to a host apparatus and an expansion device.

BACKGROUND

As semiconductor integrated circuits become finer, the power supply voltages and signal voltages of host apparatuses and memory devices are required to be lowered. Accordingly, in the situation where host apparatuses and memory devices suitable for high voltage operation are widely in use, if host apparatuses and memory devices suitable for low voltage operation are circulated, then they may be mixed to be used.

CITATION LIST

Patent Literature

[PTL 1] International Publication No. WO2006/057340

BRIEF DESCRIPTION OF THE DRAWINGS

FIG. 12 is a diagram showing the contents of the CMD8 for a 1.8 V power-supply LVS SD card that the host apparatus according to the second embodiment transmits;

FIG. 14 is a diagram showing compatibility between the host apparatus and the memory device according to the second embodiment;

DETAILED DESCRIPTION

In general, according to one embodiment, an expansion device comprises a clock swing detecting unit, a command receiving unit, and a response generating unit. The clock swing detecting unit detects a clock swing set based on a second signal voltage lower than a first signal voltage before the start of initialization. The command receiving unit receives a command having a parameter incorporated that can indicate which signal voltage of the first signal voltage and second signal voltage is being used. The response generating unit responds to the command based on the clock swing.

The host apparatuses and expansion devices according to embodiments will be described in detail below with reference to the accompanying drawings. The foregoing expansion device refers to a device which can add a function externally to a host apparatus by being connected to a slot of a host apparatus. The function external addition may be addition of a function which the host apparatus does not have or reinforcement of a function which the host apparatus has. This expansion device can operate by being connected to a host apparatus, and the expansion device cannot autonomously operate on its own. That is, the expansion device can receive power supply, a clock, and commands from a host apparatus and return a response in response to the command and transmit/receive data. The slot can comprise a power supply terminal, a clock terminal, a command terminal, and data terminals. By connecting this expansion device to a host apparatus, functional versatility and flexibility of the host apparatus can be improved. This expansion device may be a memory card or an SDIO card. For example, GPS, a camera, Wi-Fi, an FM radio, Ethernet, a bar code reader, and Bluetooth can be cited as functions provided by an SDIO card. The host apparatus has a slot that is a socket for an expansion device and can send power supply, a clock, and commands via the slot and receive a response in response to the command and transmit/receive data. The host apparatus may be a personal computer or a portable information terminal such as a smart phone or a peripheral unit such as a printer or a copying machine or an information appliance such as a refrigerator or a microwave oven. The present invention is not limited to the embodiments below.

First Embodiment

Figure 1:
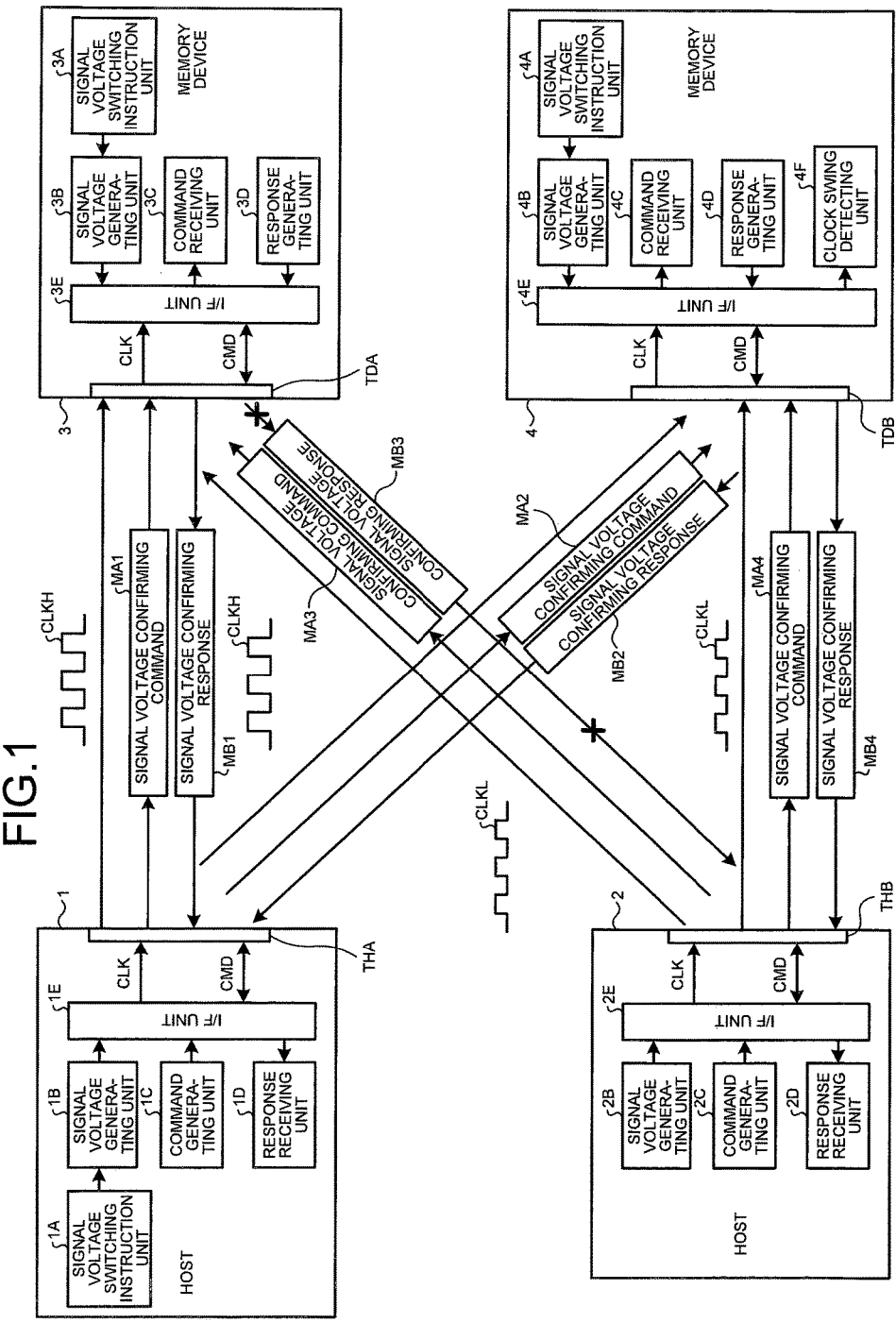
FIG. 1 is a block diagram showing the initialization start operation of host apparatuses and memory devices according to a first embodiment.

FIG. 1 is a block diagram showing the initialization start operation of host apparatuses and memory devices according to the first embodiment. In FIGS. 1 to 14, description will be made taking a memory device as an example of an expansion device. FIGS. 1, 11, 15 to 18 show front stages that perform communication between a host and an expansion device via bus interface signals that are a clock, commands/responses, and data, and terminal portions that form transmission lines between the host and the expansion device, which are extracted from the whole.

In FIG. 1, hosts 1, 2 can send commands to memory devices 3, 4 in order to initialize the devices and receive responses from the memory devices 3, 4. The memory devices 3, 4 are configured to be attachable to and detachable from the hosts 1, 2 and can hold data in a nonvolatile semiconductor memory. Terminal portions THA, THB are provided in the hosts 1, 2, and terminal portions TDA, TDB are provided in the memory devices 3, 4. Any connection combination of the hosts 1, 2 and the memory devices 3, 4 is possible, and they are connected by clock lines CLK, command lines CMD, and the like via the terminal portions so as to be able to communicate.

Here, the host 1 and the memory device 3 can communicate with use of high voltage signals, and the host 2 and the memory device 4 can communicate with use of low voltage signals. For example, the high voltage signals can be set to be of 3.3 V, and the low voltage signals can be set to be of 1.8 V. Note that the signals can include a clock, data, and commands. The power supply voltage supplied from the hosts 1, 2 to the memory devices 3, 4 can be set at a high voltage. The power supply voltage can be set at, e.g., 3.3 V.

The memory device 3 operates with high voltage signals at the start of initialization and can switch the signal levels from high voltage signals to low voltage signals during the initialization. The host 1 and the memory device 3 can operate in compliance with, e.g., Ultra High Speed UHS-I Standard for SD cards. The host 2 and the memory device 4 continue operating with low voltage signals from the start of initialization and can be used without using high voltage signals. Such hosts and cards adapted for LVS (Low Voltage Signaling) are hereinafter called LVS hosts and LVS cards.

A signal voltage switching instruction unit 1A, a signal voltage generating unit 1B, a command generating unit 10, a response receiving unit 1D, and an I/F unit 1E are provided in the host 1. The signal voltage switching instruction unit 1A can instruct to switch the signal level from a high voltage to a low voltage in an initialization sequence. The signal voltage generating unit 1B can set the signal level at the high voltage or the low voltage. The command generating unit 10 can issue whatever command the host 1 generates. The response receiving unit 1D holds the response to the command issued by the command generating unit 10, so that the host 1 can refer to the response value. The I/F unit 1E can transmit a clock via the clock line CLK and transmit a command and receive a response via the command line CMD.

A signal voltage generating unit 2B, a command generating unit 2C, a response receiving unit 2D, and an I/F unit 2E are provided in the host 2. The signal voltage generating unit 2B sets the signal level at the low voltage only. The command generating unit 2C can issue whatever command the host 2 generates. The response receiving unit 2D holds the response to the command issued by the command generating unit 2C, so that the host 2 can refer to the response value. The I/F unit 2E can transmit a clock via the clock line CLK and transmit a command and receive a response via the command line CMD.

A signal voltage switching instruction unit 3A, a signal voltage generating unit 3B, a command receiving unit 3C, a response generating unit 3D, and an I/F unit 3E are provided in the memory device 3. The signal voltage switching instruction unit 3A can switch between signal voltages according to a command to switch the signal level from the high voltage to the low voltage in the initialization sequence. The signal voltage generating unit 3B can set the signal level at the high voltage or the low voltage. The command receiving unit 3C can receive whatever command. The response generating unit 3D can generate and send a response to that command. The I/F unit 3E can receive a clock via the clock line CLK and receive a command and transmit a response via the command line CMD.

A signal voltage switching instruction unit 4A, a signal voltage generating unit 4B, a command receiving unit 4C, a response generating unit 4D, an I/F unit 4E, and a clock swing detecting unit 4F are provided in the memory device 4. The signal voltage switching instruction unit 4A can switch the signal level from the high voltage to the low voltage in the initialization sequence. The signal voltage generating unit 4B can set the signal level at the high voltage or the low voltage. The command receiving unit 4C can receive whatever command. The response generating unit 4D can generate and send a response to that command. The I/F unit 4E can receive a clock via the clock line CLK and receive a command and transmit a response via the command line CMD. The clock swing detecting unit 4F can detect the swing of a clock CLKL received via the I/F unit 4E.

Note that the signal voltage generating units 1B to 4B can be constituted by analog circuits and that the signal voltage switching instruction units 1A, 3A, 4A, command generating units 1C, 2C, command receiving units 3C, 4C, response receiving units 1D, 2D, response generating units 3D, 4D, I/F units 1E to 4E, and clock swing detecting unit 4F can be constituted by logic circuits. The command generating units 1C, 2C, command receiving units 3C, 4C, response receiving units 1D, 2D, and response generating units 3D, 4D may be implemented by firmware processing by a processor. To be able to receive high voltage signals and low voltage signals, input threshold of clock and command signals is set to low until receipt of the voltage confirming command and input threshold is changed by the voltage confirming command.

Suppose that the memory device 3 is connected to the host 1. At this time, a clock CLKH is supplied from the host 1 to the memory device 3. The signal level of the clock CLKH is set at the high voltage. After a predetermined number of pulses of the clock CLKH are supplied, a signal voltage confirming command MA1 is transmitted from the host 1 to the memory device 3. The signal voltage confirming command MA1 designates the high signal voltage level that is currently used by the host 1. Then a signal voltage confirming response MB1 in response to the signal voltage confirming command MA1 is transmitted from the memory device 3 to the host 1. When the host 1 receives the signal voltage confirming response MB1, the host 1 determines whether the continuation of initialization is possible. In the case of being compliant with UHS-I Standard, the process (voltage switching sequence) of switching from high voltage signals to low voltage signals is executed during initialization, and the initialization sequence is continued with that low-voltage signal level.

In contrast, suppose that the memory device 4 is connected to the host 1. At this time, the clock CLKH is supplied from the host 1 to the memory device 4. The memory device 4 can receive a command either high voltage signaling or low voltage signaling. Then, after a predetermined number of pulses of the clock CLKH are supplied, a signal voltage confirming command MA2 is transmitted from the host 1 to the memory device 4. The signal voltage confirming command MA2 designates the high signal voltage level that is currently used by the host 1. Then a signal voltage confirming response MB2 in response to the signal voltage confirming command MA2 is transmitted from the memory device 4 to the host 1. When the host 1 receives the signal voltage confirming response MB2, the host 1 determines whether the continuation of initialization is possible. In the case of being compliant with UHS-I Standard, the process of switching from high voltage signals to low voltage signals is executed during initialization, and the initialization sequence is continued with that low-voltage signal level.

In contrast, suppose that the memory device 3 is connected to the host 2. At this time, a clock CLKL is supplied from the host 2 to the memory device 3. The signal level of the clock CLKL is set at the low voltage. Then, after a predetermined number of pulses of the clock CLKL are supplied, a signal voltage confirming command MA3 is transmitted from the host 2 to the memory device 3. The signal voltage confirming command MA3 designates the low-voltage signal level that is currently used by the host 2. At this time, because the host 2 supports only low voltage signals, and the memory device 3 supports only high voltage signals, it depends on implementation whether the memory device 3 can recognize the clock CLKL and whether it can receive the signal voltage confirming command MA3. Anyway, in the case where the memory device 3 cannot recognize the command or is not adapted for the signal voltage of the command, a signal voltage confirming response MB3 is not transmitted, so that the host 2 rejects the memory device 3. As such, by arranging such that the signal voltage confirming response MB3 is not transmitted from the memory device 3 to the host 2, the transmission of a high voltage signal to the host 2 can be prevented, and thus the host 2 can be protected even if the memory device 3 is connected to the host 2.

In contrast, suppose that the memory device 4 is connected to the host 2. At this time, the clock CLKL is supplied from the host 2 to the memory device 4. The memory device 4 can receive a command either high voltage signaling or low voltage signaling. Then, after a predetermined number of pulses of the clock CLKL are supplied, a signal voltage confirming command MA4 is transmitted from the host 2 to the memory device 4. The signal voltage confirming command MA4 designates the low-voltage signal level that is currently used by the host 2. Then a signal voltage confirming response MB4 in response to the signal voltage confirming command MA4 is transmitted from the memory device 4 to the host 2. When the host 2 receives the signal voltage confirming response MB4, the host 2 determines whether the continuation of initialization is possible. If the continuation is possible, the initialization sequence is continued with the low-voltage signal level.

Further, by connecting voltage detector to the clock swing detecting unit 4F in the memory device 4, the threshold for the command line signal can be determined based on the swing of the clock CLKL (signal voltage level of clock). Hence, even where the input voltage range of the low voltage signal overlaps that of the high voltage signal, the threshold voltage for command input is made to match the clock swing on the assumption that the host will send the clock and a command that are of the same voltage level, thereby increasing the possibility that commands can be correctly received. The threshold voltage for command input needs to be adjusted before a command is received.

If there is an overlap, the voltage detecting method cannot reliably distinguish the low voltage signal and the high voltage signal, and hence the signal voltage confirming command and the signal voltage confirming response are used to reliably realize the signal voltages used by the host and the memory device.

Here, by incorporating a parameter indicating whether the high signal voltage or the low signal voltage is being used into the signal voltage confirming command MA4, the card can recognize the signal voltage confirming command and reliably ascertain in which state the signal voltage of the host is. Further, by setting the signal voltage level accepted by the memory device in the response MB4, the host that has received it can realize whether the memory device supports that signal voltage level. Thus, allowing the host 2 and memory device 4 to operate with low voltages can be achieved while dealing with the host 1 and memory device 3 suitable for high voltage operation, so that adapting the Application-Specific Integrated Circuit (ASIC) process applied to the manufacture of the host 2 to produce finer circuits can be realized.

Figure 2:
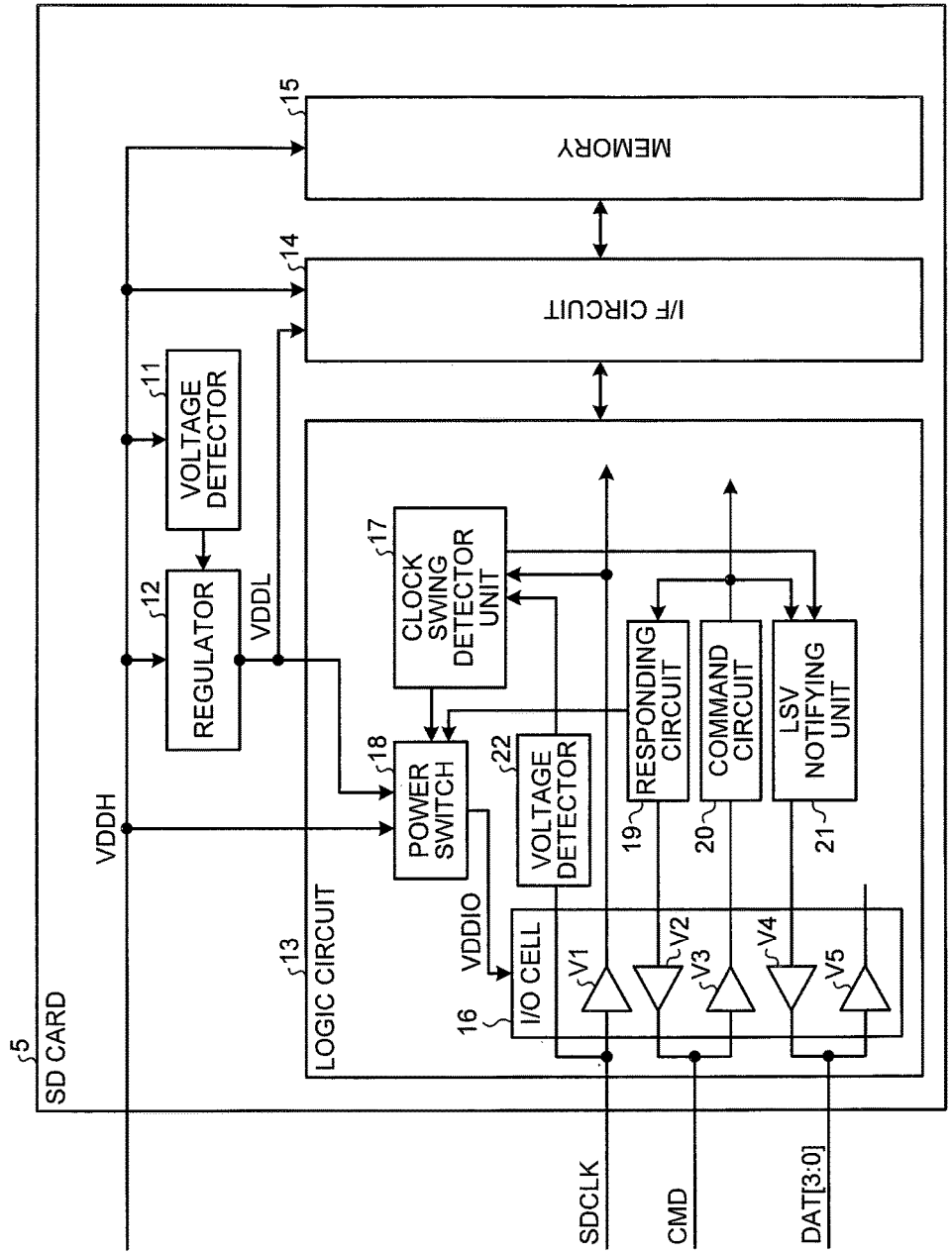
FIG. 2 is a block diagram showing an example configuration of the memory device according to the first embodiment.

FIG. 2 is a block diagram showing an example configuration of the memory device according to the first embodiment. FIG. 2 takes an SD card adapted for LVS as an example. This SD card 5 can be used as the memory device 4 in FIG. 1.

In FIG. 2, in the SD card 5, there are provided a voltage detector 11, a regulator 12, a logic circuit 13, an I/F circuit 14, and a memory 15. The logic circuit 13 can access the memory 15 via the I/F circuit 14. In the logic circuit 13, there are provided an I/O cell 16, a clock swing detector unit 17, a power switch 18, a responding circuit 19, a command circuit 20, an LVS notifying unit 21 and voltage detector 22. In the I/O cell 16, input buffers V1, V3, V5 and output buffers V2, V4 are provided. For example, a NAND flash memory suitable for use with a high power supply voltage VDDH can be used as the memory 15. The high power supply voltage VDDH can be set at, e.g., 3.3 V. The high power supply voltage VDDH is supplied to the voltage detector 11, regulator 12, I/F circuit 14, memory 15, and power switch 18. A clock SDCLK is inputted via the input buffer V1. A command is outputted via the output buffer V2 and inputted via the input buffer V3. Data DAT[3:0] is outputted via the output buffer V4 and inputted via the input buffer V5.

The logic circuit 13 in FIG. 2 can use a third voltage lower than the power supply voltage. This may be needed because the usable voltage differs between parts due to the ASIC process being adapted to produce finer circuits. Meanwhile, VDDIO of the I/O cell 16 requires providing a supply voltage which is the same as the signal voltage. Then VDDIO is provided either high power supply voltage or low power supply voltage according to signal voltage correspondent. If VDDIO and the third voltage are different, I/O cell and logic circuit are connected through a level shift circuit which is not described in FIG. 2. Then VDDIO and the third voltage may be different. When the voltage detector 11 detects the high power supply voltage VDDH, the regulator 12 converts the high power supply voltage VDDH into a low power supply voltage VDDL to supply to the I/F circuit 14 and the power switch 18 and a power supply voltage to VDDIO is selected. Further, a voltage detector 22 is connected at the front of the I/O cell V1, to measure signal voltage of clock SDCLK is whether high or low to a threshold voltage. To switch threshold of clock input buffer, it is necessary to measure voltage before clock input buffer. The result of the voltage detector 22 is connected to the clock swing detector unit 17 and detected which signal voltage is used (high or low) by host. The output of the SDCLK buffer is also connected to the clock swing detector unit 17 to detect oscillation of the clock. Generally the output of the SDCLK input buffer is used for a clock of logic circuit. Then, the power switch 18 switches a I/O cell power supply VDDIO to supply power to the I/O cell 16 according to host signal voltage (high or low). The input threshold of clock SDCLK input and command CMD input are determined by according to the result of the voltage detector 22 or voltage of the cell power supply VDDIO. Thus, when a high voltage signal is inputted, the high voltage signal can be accurately detected, and when a low voltage signal is inputted, the low voltage signal can be accurately detected.

It is necessary to consider pull-up voltage on selecting of VDDIO voltage. If low voltage was supplied to I/O cell and host pulls-up the signal line to high voltage, the I/O cell would be damaged. Particularly, as command CMD and data DAT[3:0] may be pulled-up to the high voltage, use of a voltage confirming command (explained later) provides safer method that I/O cell voltage is determined by a setting of the voltage confirming command. As SDCLK which is not pulled-up, VDDIO of SDCLK may be selected the result of the voltage detector 22 or a setting of the voltage confirming command. Details are not described in FIG. 2, VDDIO may be switched independently to each I/O cell or may be switched together.

VDDIO of command CMD input is supplied high voltage as default until the voltage confirming command is received, command recognition level can be improved by controlling input threshold according to the result of voltage detector 22. Finally, VDDIO of command CMD is determined by the voltage confirming command and then the memory device can surely return the response of the voltage confirming command with signal voltage same as host used.

When a command is inputted to the command circuit 20 via the command line CMD, the command number is decoded to identify the function of the command so that the processing designated by that command is performed and that an instruction to respond to the command is outputted to the responding circuit 19. Then the responding circuit 19 creates a response according to the instruction to respond and outputs onto the command line CMD via the output buffer V2. Here, if the command is a signal voltage confirming command CMD8, the response format is almost equivalent to the argument of CMD8 as described in FIG. 4 and FIG. 12 except that VCA in the response is correspondent to VHS in the argument. VHS indicates host signal voltage currently used and if memory device can support the same power supply voltage and signal voltage; setting information is passed from the command circuit 20 to the responding circuit 19 and VCA is set to the same value as VHS. In another word, returning the response with the same as argument means that the memory device supports the power supply voltage and the signal voltage host currently used. At this time, if the signal voltage set in the field VCA of the CMD8 response does not match the detecting result of the voltage detector 22, the responding circuit 19 sets the cell power supply VDDIO again to match the signal voltage set in the field VCA of the CMD8 response. After setting the cell power supply VDDIO again, the responding circuit 19 outputs a response to the instruction to respond onto the command line CMD via the output buffer V2. If it cannot support the signal voltage set in the field VHS of the CMD8, the responding circuit 19 does not return a response to host.

FIG. 3(a) is a timing chart showing the signal waveforms of the clock and a command transmitted to the memory device according to the first embodiment, and FIG. 3(b) is a diagram showing the waveform of the power supply voltage when rising of the memory device according to the first embodiment. In FIG. 3(a) and FIG. 3(b), the case where the power supply voltage is 3.3 V with the signal voltage being 1.8 V is taken as an example.

In FIG. 3(a) and FIG. 3(b), according to UHS-I Standard, at the start of initialization, the signal voltage is set at 3.3 V. Hence, the stabilizing period after the power supply voltage has risen is set to 1 msec at the shortest. In contrast, in the case of an LVS host/card, before the start of initialization, the signal voltage is set at 1.8 V. Hence, the stabilizing period after the power supply voltage has risen is set to, e.g., 10 msec, allowing for the time until the output voltage of the regulator 12 of FIG. 2 becomes stable. The necessary time length of the stabilizing period is set according to the implementation of the regulator.

Further, the host supplies at least 74 clock pulses of the clock SDCLK before issuing the first command. The power switch 18 may be configured to perform power supply independently to each of the SDCLK I/O cell, command I/O cell, and data I/O cell. This is because it needs to supply a high voltage power supply as an initial value and to have high voltage resistance, taking into account the case where a high-voltage-signal host has the command line and data lines pulled up to a high voltage. At least for command input, the signal voltage detection is completed within 74 clock pulses, and the threshold of command input buffer is switched according to the result of voltage detector 22, so that a command can be received. As described later with reference to FIG. 8, there is a possibility of wrong detection in the signal voltage detection-, and even if the clock SDCLK is detected to be a low voltage signal, the command CMD and data DAT[03:00] may be pulled up to a high voltage. Hence, I/O cell voltages for the command and data should be kept at the high voltage until it is confirmed by a voltage identifying command.

FIG. 3(c) shows the waveform when an LVS card detects that the clock SDCLK is of the low signal voltage. A conventional host would have DAT[03:00] pulled up to 3.3 V, but need not have them pulled up before initialization, nor does the host use the data lines until initialization finishes. An LVS host would have at least DAT[03] of DAT[03:00] pulled up to 1.8 V since the clock SDCLK starts to be supplied. An LVS card drives DAT[03] to be at a low (L) level by the LVS notifying unit 21 when clock oscillation is detected by the clock swing detector unit 17 of FIG. 2. If voltage detector 22 is implemented, card can drive DAT[03] to be at a low (L) level when low voltage signal is detected on SDCLK. Further, when the command circuit 20 detects the reception of a command, DAT[03] is made to return to tristate so as to slowly return to a high (H) level due to pull-up.

The power supply VDDIO of DAT[03:00] needs to be of a 3.3 V power supply voltage so as to withstand 3.3 V pull-up, taking into account wrong detection of the clock voltage level. The power supply VDDIO of DAT[03:00] is switched according to the determination by a voltage identifying command. An LVS host realizes that the card supports LVS by detecting DAT[03] becomes the L level with being pulled up after 74 clocks supply and before issuing the first command. In the case of host implementation is not resistant to the high signal voltage, for safety, if detecting that DAT[03] has become the L level, the host can issue commands to the card to proceed card initialization, and, if DAT[03] is at the H level, host stops initialization. By this means, the possibility can be eliminated that the LVS host may receive a high voltage response because of card wrong implementation.

Figures 4, 5:
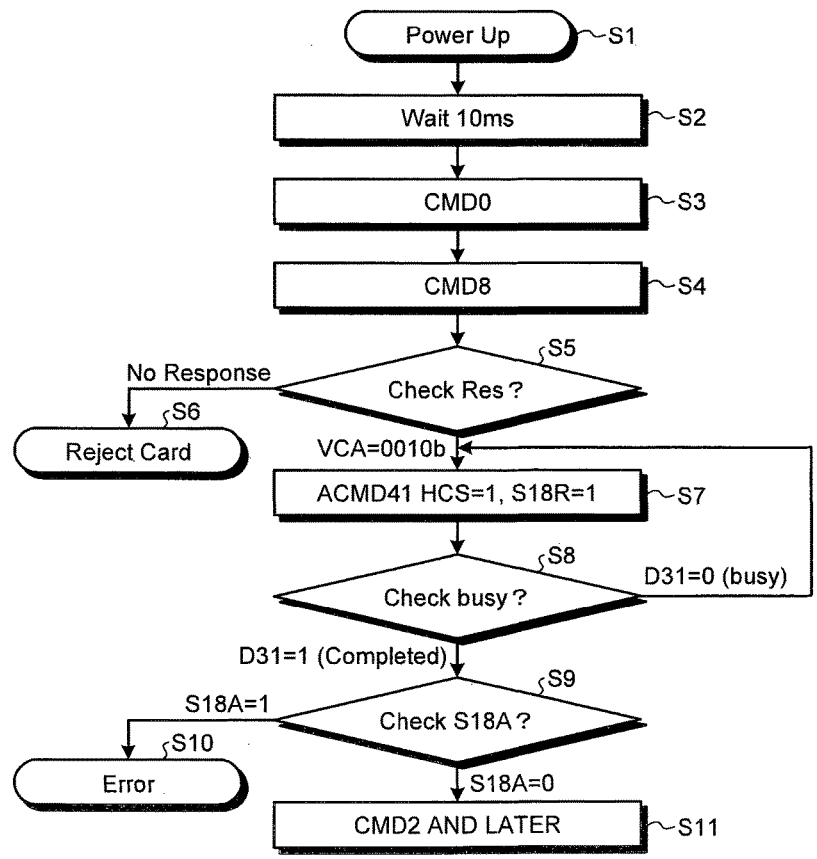
FIG. 4 is a diagram showing the contents of a CMD8 for an Low Voltage Signaling (LVS) SD card that the host apparatus according to the first embodiment transmits.
FIG. 5 is a flow chart showing the initialization sequence of the host apparatus according to the first embodiment.

FIG. 4 is a diagram showing the contents of the CMD8 for an LVS SD card that the host apparatus according to the first embodiment transmits.

In FIG. 4, a command argument of 0001 b indicating that the signal voltage is 3.3 V is defined for the field VHS of a conventional CMD8. In contrast, a command argument of 0010 b indicating that the signal voltage is 1.8 V is defined for the field VHS of the CMD8 for LVS. Where the memory device 4 of FIG. 1 is an LVS card, when receiving the CMD8 from the host 2, the memory device 4 can identify the command argument of 0010 b and copy the command argument of 0010 b into a response to the CMD8 to return to the host 2. Then when receiving the response to the CMD8 from the memory device 4, the host 2 can realize that the memory device 4 is an LVS card.

In contrast, where the memory device 3 of FIG. 1 is compliant with UHS-I Standard, when receiving the CMD8 from the host 2, the memory device 3 cannot identify the command argument of 0010 b and does not return a response to the CMD8 to the host 2. Thus, the host 2 can realize that the memory device 3 is not an LVS card and reject the memory device 3.

As to the check pattern, a different check pattern may be set according to whether the signal voltage is 1.8 V or 3.3 V.

Figure 6:
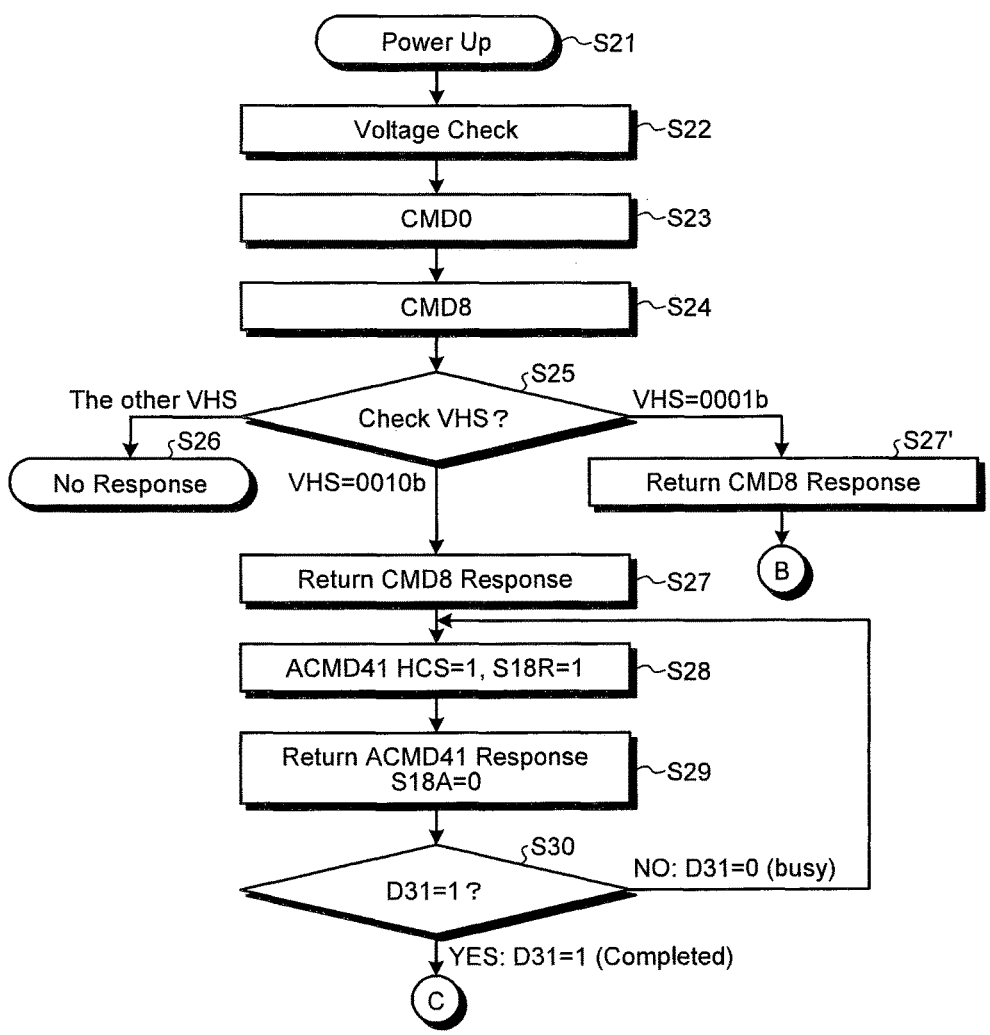
FIG. 6 is a flow chart showing the initialization sequence of the memory device according to the first embodiment.

FIG. 5 is a flow chart showing the initialization sequence of the LVS host apparatus according to the first embodiment. In FIGS. 5 and 6, command issuing and response reception are stated in a pair. Note that CMD0 is, as an exception, a command that does not return a response.

In FIG. 5, when powered on (S1), the host waits for 10 ms until the output voltage of the regulator 12 of FIG. 2 becomes stable (S2). Then the host issues a command CMD0 (S3). At this time, the signal voltage of 1.8 V is used for the clock line CLK and the command line CMD. Then the host sets a command argument of 0010 b in the field VHS of a CMD8 and issues the command CMD8 (S4). Then the host checks the response to the command CMD8 issued (S5). Here, the LVS card can return a response whose field VCA corresponding to the VHS is set at 0010 b. If no response from the card, the host rejects that card (S6). In contrast, if the VCA in the response to the command CMD8 issued is at 0010 b, the host issues an initializing command ACMD41 (S7). At this time, an argument S18R of the ACMD41 is set at 1 to indicate the use of the low signal voltage. Then the host refers to a field D31 in the response to the ACMD41 to determine whether the card is in a busy state (S8) and, if not in the busy state, checks a bit S18A included in the response to the ACMD41 (S9). Here, if the D31=1, the host can go out of the S8 loop. On the other hand, if the D31 remains at 0, at S8 and the loop of S7 and S8 is repeated, then the host detects a timeout by a timer incorporated therein to determine the occurrence of an error.

Then the host checks the bit S18A included in the response to the ACMD41 (S9). If the LVS card has switched the signal level to the low voltage signal, the bit S18A is set at 0, and a voltage switching sequence (CMD11) is skipped. Then the process of command CMD2 issuing and later is executed (S11). As a result of checking the S18A, if the S18A=1, the host determines the occurrence of an error (S10), so that the process stops.

Figure 7:
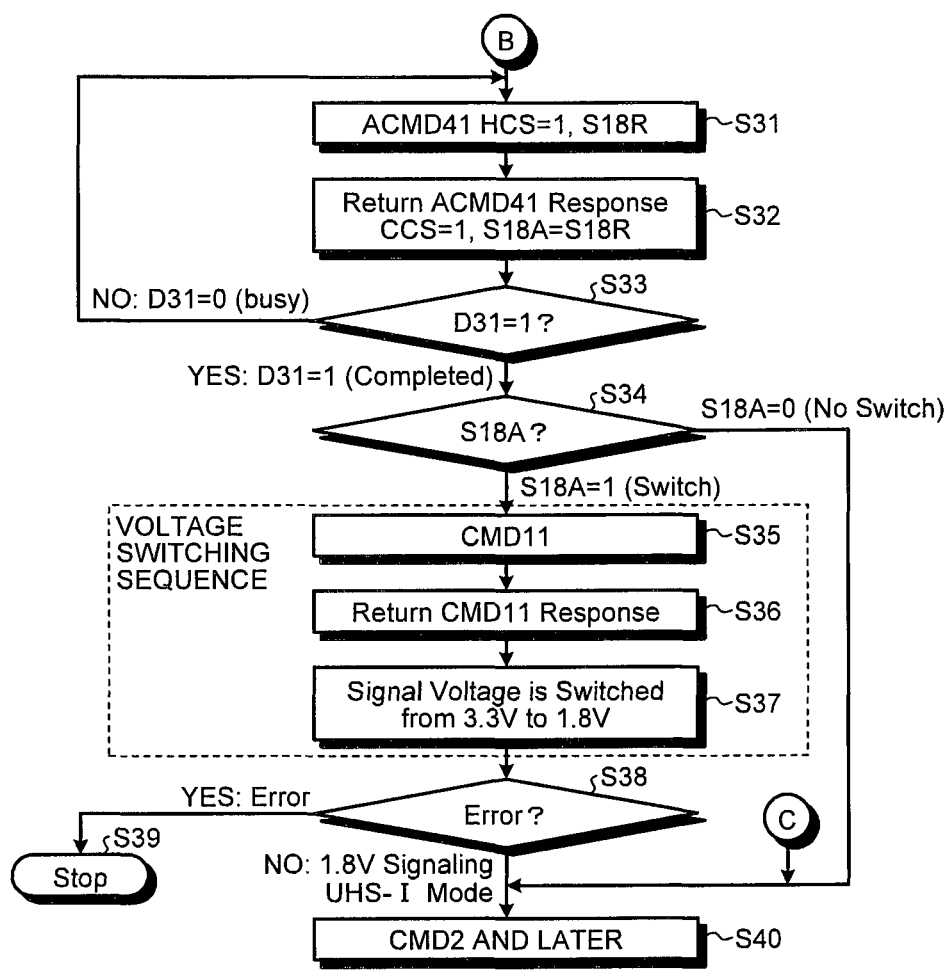
FIG. 7 is a flow chart showing the initialization sequence of the memory device according to the first embodiment.

FIGS. 6 and 7 are a flow chart showing the initialization sequence of the LVS memory device according to the first embodiment. In FIG. 7, for the command CMD2 and later, only command reception is stated with response issuing being omitted.

In FIG. 6, when powered on (S21), the card detects signal voltage level of the clock SDCLK (S22). Then the card switches between thresholds for the command line signal based on the result of the voltage detector 22 (Another implementation of setting input threshold to low voltage makes voltage detector 22 not essential and can omit step S22). Then when receiving the command CMD0 from the host, the card performs reset operation (S23). Then when receiving a command CMD8 from the host (S24), the card checks the field VHS (S25). If a command argument of 0001 b or 0010 b is not set in the field VHS, the card does not return a response (S26). On the other hand, if 0001 b is set in the field VHS, the card returns a response of a high voltage signal whose field VCA equals VHS to the host. If 0010 b is set therein, the card returns a response of a low voltage signal whose field VCA equals VHS to the host (S27, S27'). In FIG. 6, S27 and later denote a sequence in the case of VHS=0010 b (FIG. 7). Then when receiving the command ACMD41, the card checks whether the S18R=1 (S28). Then the card sets the S18A at 0 and returns a response to the ACMD41 to the host (S29). If the execution of the ACMD41 has finished, the card returns the D31=1 and, if it continues being executed, returns the D31=0. The value of the S18A is valid when the D31=1. If an initializing command has already been executed with low voltage signals, the card has to return the S18A=0, and thus the voltage switching sequence (CMD11) is skipped as shown in FIG. 7, and the process of command CMD2 issuing and later is executed (S40).

On the other hand, if a command argument of 0001 b is set in the field VHS at S25, when, after the card returns a response to the CMD8 with a high voltage signal, the host issues the command ACMD41 (S31) as shown in FIG. 7, the card returns a response with S18A=S18R to the host (S32) because it is supposed that this card supports UHS-I. Next, the host determines whether the D31=1 (S33), if the D31=0, the process returns to S31, and the process of S31 to S33 is repeated. The value of the S18A is valid when the D31=1. On the other hand, if the D31=1, after the execution of the ACMD41 has finished, the operation divides into two according to the return value of the S18A (S34). If the card has returned the S18A=0, the command to receive next time is CMD2 in S40, so that the voltage switching sequence has to be skipped. That is, it remains in a high voltage signal mode. If receiving the CMD11, the card determines it as an error. On the other hand, if the card has returned the S18A=1, the process proceeds to the voltage switching sequence. Then when receiving the command CMD11 from the host during the voltage switching sequence (S35), the card returns a response to the command CMD11 (S36), and switches the signal voltage from 3.3 V to 1.8 V (S37). Then it is determined whether an error has occurred (S38). If an error has occurred, the process is stopped (S39), and, if not, switching to low voltage signals has succeeded, and the process proceeds to S40.

Figures 8, 9:
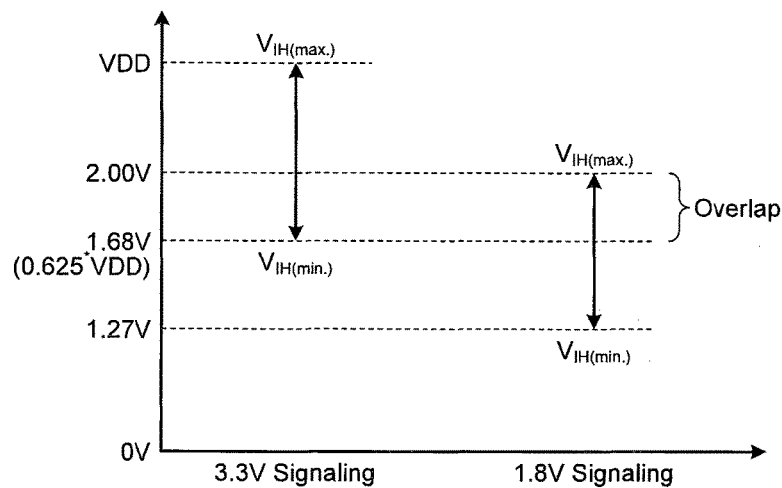
FIG. 8 is a diagram showing the range of signal voltages of the host apparatus according to the first embodiment.
FIG. 9 is a diagram showing compatibility between the host apparatus and the memory device according to the first embodiment.

FIG. 8 is a diagram showing the voltage range of the input signal which the input buffer used in the memory device and the host apparatus according to the first embodiment recognizes as a high (H) level.

In FIG. 8, for the signal level of 3.3 V, the maximum value $V_{IH(max)}$ of the signal level is set at a power supply voltage VDD, and the minimum value $V_{IH(min)}$ of the signal level is set at 1.68 V. For the signal level of 1.8 V, the maximum value $V_{IH(max)}$ of the signal level is set at 2.0 V, and the minimum value $V_{IH(min)}$ of the signal level is set at 1.27 V. When the voltage value of the signal is located between the maximum value $V_{IH(max)}$ and the minimum value $V_{IH(min)}$ the card determines that the logic state of the signal is at the H level. As a result, there is an overlap in input voltage range between the signal levels of 3.3 V and 1.8 V, and thus it may not be able to be reliably identified whether the signal voltage level is 3.3 V or 1.8 V. However, by determining the input voltage threshold of the command CMD signal based on the signal voltage of the clock SDCLK, the possibility that the command can be correctly received is increased even if the host drives the high voltage signal rather low, and hence there is no problem in command reception even if wrong detection occurs.

At this time, for example, if it is determined whether the signal level is at or above 2.00 V in order not to be dependent on variation in the 1.8 V signal voltage, the possibility that a mismatch with the result of receiving the command CMD8 may occur will be limited to the case where the 3.3 V signal voltage is at or below 2.0 V at reception because of attenuation in the transmission path. The method of dealing with this is as follows.

(1) If, although the card has detected a signal of 2.0 V or lower, the 3.3 V signal voltage is designated by the command CMD8, the input threshold voltage may be switched to 3.3 V since the signal of 2.0 V or lower is being received, but the input threshold voltage may be kept at 1.8 V in order to receive more safely. At this time, the I/O cell power supply needs to be at 3.3 V, and the card outputs signals of the 3.3 V signal voltage.

(2) If, although the card has detected a signal of 2.0 V or higher, the 1.8 V signal voltage is designated by the command CMD8, this means that the LVS host is not applying a correct voltage to the card, and hence the memory device should stop host initialization by returning no response of CMD8.

FIG. 9 is a diagram showing compatibility between the host apparatus and the memory device according to the first embodiment. Here, HVS (High Voltage Signaling) indicates operation with high voltage signals (e.g., 3.3 V); LVS (Low Voltage Signaling) indicates operation with low voltage signals (e.g., 1.8 V); HVS to LVS indicates operation of switching from high voltage signals to low voltage signals during initialization in compliance with UHS-I Standard; LVDS (Low Voltage Differential Signaling) indicates operation compliant with UHS-II Standard; and N/A (Not Available) indicates being unusable.

In FIG. 9, the LVS host can use only cards adapted for LVS. In FIG. 1, the case where the host 1 and the memory device 3 support a UHS-I mode and where the host 2 and the memory device 4 support an LVS UHS-I mode is taken as an example. UHS-II cards also support the UHS-I mode and hence can support LVS. That is, LVS UHS-II cards can have both of two constant voltage modes that are a UHS-II mode with a lowered voltage of about 400 mV and the UHS-I mode with a lowered voltage of about 1.8 V.

Figure 10:
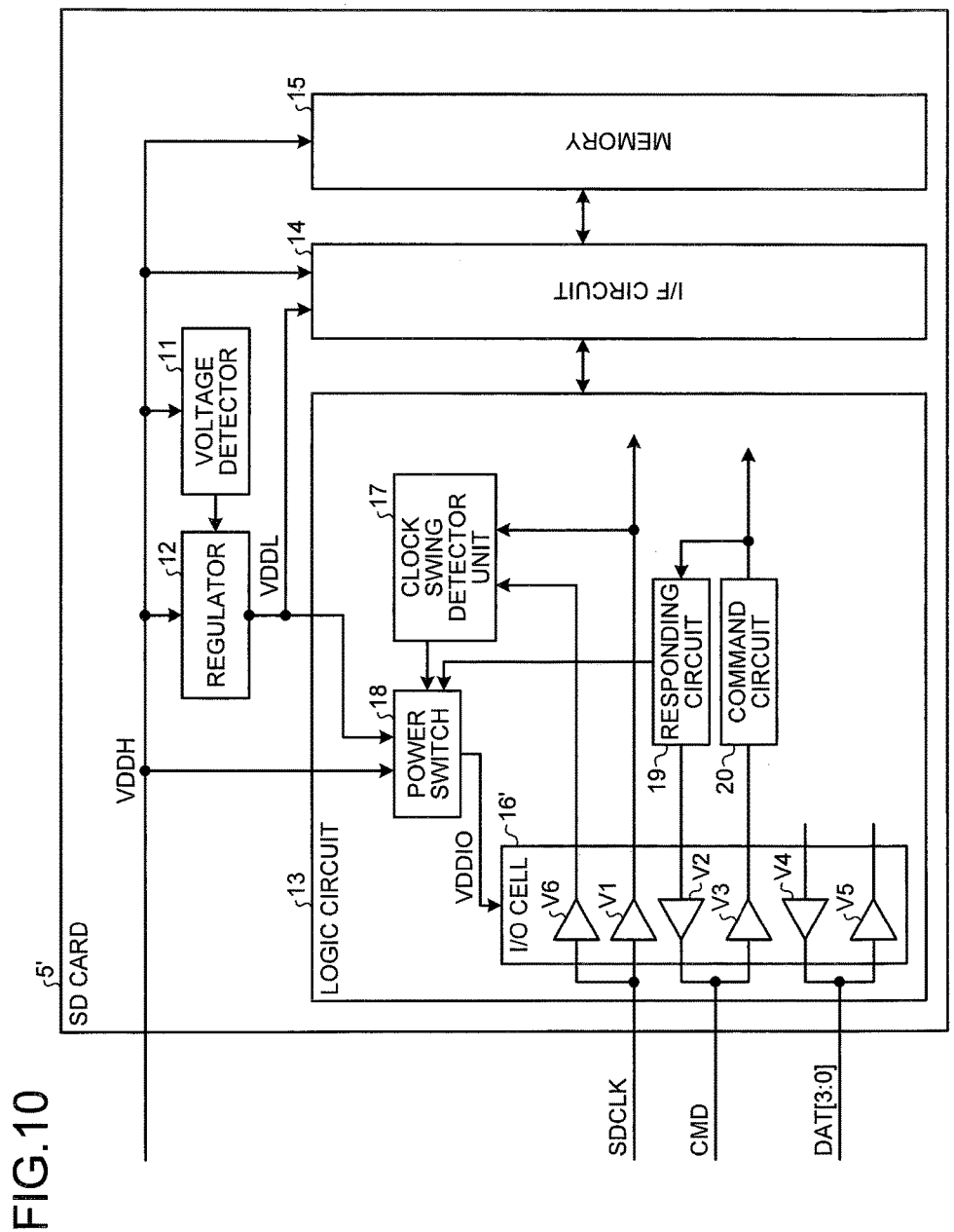
FIG. 10 is a block diagram showing another example configuration of the memory device according to the first embodiment.

FIG. 10 is a block diagram showing another example configuration of the memory device according to the first embodiment. This example shows the case of voltage detector is not implemented.

The I/O cell VDDIO needs to be supplied by high power supply voltage so as to withstand high voltage pull-up. The clock SDCLK and command CMD inputs may be either high signal voltage or low signal voltage and then input threshold is set to low voltage signal so that both signal voltages can be received. Unbalanced threshold affects duty ratio of signal but it is no problem if logic circuits are designed regardless of signal duty ratio.

Regarding implementation of input buffer, for example, the clock SDCLK input buffer V1 and command CMD input buffer V3 is designed to be selectable either for high signal voltage or low signal voltage. In another method as described FIG. 10, high power supply voltage and low voltage threshold buffer V6 is used. V6 is not essential but it is indicated as one of implementation examples (this method can be applied to command input as well).

In particular, until receipt of the voltage confirming command CMD8, 3.3V power is supplied to clock input buffer and command input buffer so that 3.3V tolerance is available and both 3.3V signal and 1.8V signal can be received. After receiving the voltage confirming command CMD8, the input buffers are configured to either setting threshold for 3.3V signal by supplying 3.3V power or setting threshold for 1.8V signal by supplying 1.8V power.

Second Embodiment

Figure 11:
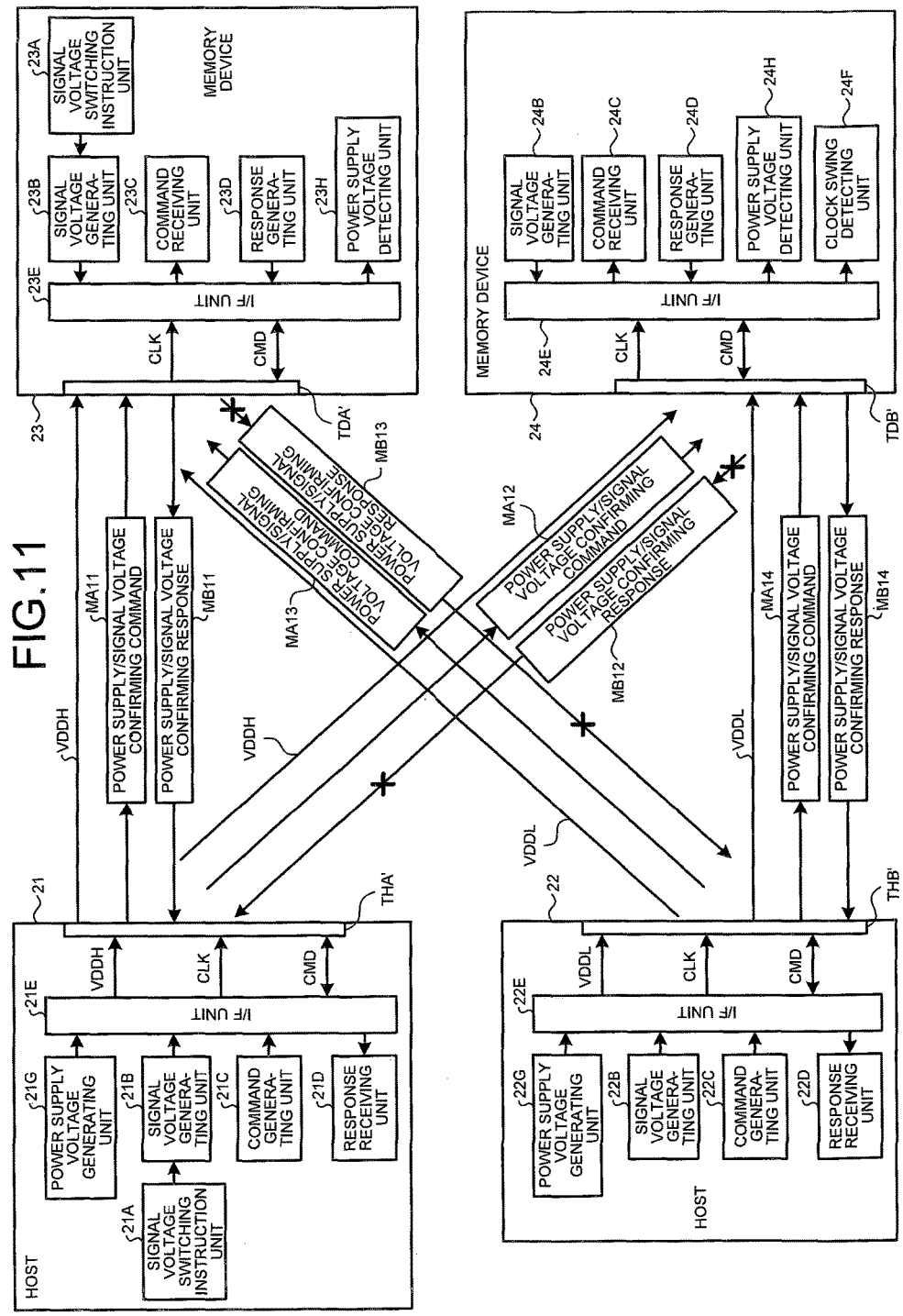
FIG. 11 is a block diagram showing the initialization start operation of host apparatuses and memory devices according to a second embodiment.

FIG. 11 is a block diagram showing the initialization start operation of host apparatuses and memory devices according to the second embodiment.

In FIG. 11, hosts 21, 22 can send commands to memory devices 23, 24 in order to initialize the devices and receive responses from the memory devices 23, 24. The memory devices 23, 24 are configured to be attachable to and detachable from the hosts 21, 22 and can hold data in a nonvolatile semiconductor memory. Terminal portions THA', THB' are provided in the hosts 21, 22, and terminal portions TDA', TDB' are provided in the memory devices 23, 24. By connecting the terminal portions THA' and TDA', a power supply line, a clock line CLK, a command line CMD, and the like can be formed between the host 21 and the memory device 23. By connecting the terminal portions THB' and TDB', a power supply line, a clock line CLK, a command line CMD, and the like can be formed between the host 22 and the memory device 24.

Here, the host 21 and the memory device 23 operate with a high power supply voltage VDDH, and the host 22 and the memory device 24 operate with a low power supply voltage VDDL. For example, the high power supply voltage VDDH can be set at 3.3 V, and the low power supply voltage VDDL can be set at 1.8 V. Further, the host 21 and the memory device 23 can switch between high voltage signals and low voltage signals to operate, and the host 22 and the memory device 24 can operate with only low voltage signals. For example, the high voltage signals can be set to be of 3.3 V, and the high level of the low voltage signals can be set to be of 1.8 V. The host 21 and the memory device 23 can operate in compliance with, e.g., 3.3 V-power supply LVS UHS-I. The host 22 and the memory device 24 can operate in compliance with, e.g., 1.8 V-power supply LVS UHS-I.

A signal voltage switching instruction unit 21A, a signal voltage generating unit 21B, a command generating unit 21C, a response receiving unit 21D, an I/F unit 21E, and a power supply voltage generating unit 21G are provided in the host 21. The signal voltage switching instruction unit 21A can instruct to switch the signal level from a high voltage to a low voltage in an initialization sequence. The signal voltage generating unit 21B can set the signal level at the high voltage or the low voltage. The command generating unit 21C can issue whatever command the host 21 generates. The response receiving unit 21D holds the response to the command issued by the command generating unit 21C, so that the host 21 can refer to the response value. The I/F unit 21E can transmit a clock via the clock line CLK and transmit a command and receive a response via the command line CMD. The power supply voltage generating unit 21G can generate the high power supply voltage VDDH.

A signal voltage generating unit 22B, a command generating unit 22C, a response receiving unit 22D, a power supply voltage generating unit 22G, and an I/F unit 22E are provided in the host 22. The signal voltage generating unit 22B sets the signal level at the low voltage. The command generating unit 22C can issue whatever command the host 22 generates. The response receiving unit 22D holds the response to the command issued by the command generating unit 22C, so that the host 22 can refer to the response value. The I/F unit 22E can transmit a clock via the clock line CLK and transmit a command and receive a response via the command line CMD. The power supply voltage generating unit 22G generates the low power supply voltage VDDL.

A signal voltage switching instruction unit 23A, a signal voltage generating unit 23B, a command receiving unit 23C, a response generating unit 23D, an I/F unit 23E, and a power supply voltage detecting unit 23H are provided in the memory device 23. The signal voltage switching instruction unit 23A can switch between signal voltages according to a command to switch the signal level from the high voltage to the low voltage in the initialization sequence. The signal voltage generating unit 23B can set the signal level at the high voltage or the low voltage. The command receiving unit 23C can receive whatever command. The response generating unit 23D can generate and send a response to that command. The I/F unit 23E can receive a clock via the clock line CLK and receive a command and transmit a response via the command line CMD. The power supply voltage detecting unit 23H can detect whether the power supply voltage is the low power supply voltage VDDL or the high power supply voltage VDDH. The power supply voltage detecting unit 23H comprises a voltage comparator having a threshold of, e.g., 2.5 V and, when detecting a voltage higher than 2.5V, realizes that a high power supply voltage host is connected thereto, so that it can have a response returned and, when determining that the voltage is lower than 2.5 V, realizes that no power supply voltage is supplied or that a low power supply voltage host is connected thereto, so that it can have a response not returned.

A signal voltage generating unit 24B, a command receiving unit 24C, a response generating unit 24D, an I/F unit 24E, a clock swing detecting unit 24F, and a power supply voltage detecting unit 24H are provided in the memory device 24. The signal voltage generating unit 24B sets the signal level at the low voltage. The command receiving unit 24C can receive whatever command. The response generating unit 24D can generate and send a response to that command. The I/F unit 24E can receive a clock via the clock line CLK and receive a command and transmit a response via the command line CMD. The clock swing detecting unit 24F can detect the swing of a clock CLKL received via the I/F unit 24E. The power supply voltage detecting unit 24H can detect whether the power supply voltage is the low power supply voltage VDDL or the high power supply voltage VDDH. The power supply voltage detecting unit 24H comprises a voltage comparator having a threshold of, e.g., 2.5 V and, when detecting a voltage higher than 2.5 V, realizes that a high power supply voltage host is connected thereto, so that it can have a response not returned. When detecting a voltage lower than 2.5 V, the detecting unit 24H can further determine, using another voltage comparator having a threshold of, e.g., 1.2 V, whether the voltage is higher or lower than it. If higher than 1.2 V, the detecting unit 24H realizes that a low power supply voltage host is connected thereto, so that it can have a response returned and, if lower than 1.2 V, realizes that power supply is not sufficiently supplied, so that it can have a response not returned.

Note that the power supply voltage generating units 21G, 22G, and signal voltage generating units 21B to 24B can be constituted by analog circuits and that the signal voltage switching instruction units 21A, 23A, command generating units 21C, 22C, command receiving units 23C, 24C, response receiving units 21D, 22D, response generating units 23D, 24D, I/F units 21E to 24E, clock swing detecting unit 24F, and power supply voltage detecting unit 23H can be constituted by logic circuits. The command generating units 21C, 22C, command receiving units 23C, 24C, response receiving units 21D, 22D, and response generating units 23D, 24D may be implemented by firmware processing by a processor.

Suppose that the memory device 23 is connected to the host 21. At this time, the high power supply voltage VDDH is supplied from the host 21 to the memory device 23. Then when detecting the high power supply voltage VDDH, the power supply voltage detecting unit 23H determines that the memory device 23 can respond. Further, a power supply/signal voltage confirming command MA11 is transmitted from the host 21 to the memory device 23. The power supply/signal voltage confirming command MA11 can designate the power supply voltage and signal voltage supported by the host 21. Then when the memory device 23 detects that the VHS setting designates the high power supply voltage and high voltage signal, a power supply/signal voltage confirming response MB11 in response to the power supply/signal voltage confirming command MA11 is transmitted from the memory device 23 to the host 21. When the host 21 receives the power supply/signal voltage confirming response MB11, the host 21 accepts the memory device 23, and the initialization sequence is continued with the high power supply voltage VDDH.

In contrast, suppose that the memory device 24 is connected to the host 21. At this time, the high power supply voltage VDDH is supplied from the host 21 to the memory device 24. When detecting the high power supply voltage VDDH, the power supply voltage detecting unit 24H determines that the memory device 24 cannot respond. A power supply/signal voltage confirming command MA12 is transmitted from the host 21 to the memory device 24, but a response is not returned, so that the host 21 rejects the memory device 24.

In contrast, suppose that the memory device 24 is connected to the host 22. At this time, the low power supply voltage VDDL is supplied from the host 22 to the memory device 24. When the power supply voltage detecting unit 24H detects the low power supply voltage VDDL, the clock swing detecting unit 24F ascertains a clock of a low voltage signal being inputted, and it determines that the memory device 24 can respond. Further, a power supply/signal voltage confirming command MA14 is transmitted from the host 22 to the memory device 24. The power supply/signal voltage confirming command MA14 can designate the power supply voltage and signal voltage supported by the host 22. Then when the memory device 24 determines that the VHS setting designates the low power supply voltage VDDL and low voltage signal, a power supply/signal voltage confirming response MB14 in response to the power supply/signal voltage confirming command MA14 is transmitted from the memory device 24 to the host 22. When the host 22 receives the power supply/signal voltage confirming response MB14, the host 22 accepts the memory device 24, and the initialization sequence is continued with the low power supply voltage VDDL.

In contrast, suppose that the memory device 23 is connected to the host 22. At this time, the low power supply voltage VDDL is supplied from the host 22 to the memory device 23. When detecting the low power supply voltage VDDL, the power supply voltage detecting unit 23H determines that the memory device 23 cannot respond. A power supply/signal voltage confirming command MA13 is transmitted from the host 22 to the memory device 23, but a response is not returned, so that the host 22 rejects the memory device 23.

With the power supply voltage detecting units 23H, 24H incorporated in the memory devices 23, 24, by incorporating the parameter designating a power supply voltage into the power supply/signal voltage confirming commands MA11 to MA14, the interactive operation between the host 21 and the memory device 23 suitable for the high power supply voltage VDDH is ensured while the host 22 and the memory device 24 suitable for the low power supply voltage VDDL can be circulated, and adapting the ASIC process applied to the manufacture of the host 22 and the memory device 24 to produce finer circuits can be realized.

Further, by lowering the power supply voltage for the host 22 and the memory device 24, where ASIC voltages and signals are lowered, the differences between the power supply voltage and the ASIC voltages/signal voltages can be decreased, so that the power consumption of the regulator can be reduced.

FIG. 12 is a diagram showing the contents of the CMD8 for a 1.8 V power-supply LVS SD card that the host apparatus according to the second embodiment transmits.

In FIG. 12, in UHS-I Standard, a command argument of 0001 b indicating that the power supply voltage is 3.3 V and that the signal voltage is 3.3 V is defined for the field VHS of the CMD8. In 3.3 V power-supply LVS UHS-I Standard, a command argument of 0010 b indicating that the power supply voltage is 3.3 V and that the signal voltage is 1.8 V is defined for the field VHS of the CMD8. In 1.8 V power-supply LVS UHS-I Standard, a command argument of 0100 b indicating that the power supply voltage is 1.8 V and that the signal voltage is 1.8 V is defined for the field VHS of the CMD8.

Where the memory device 24 of FIG. 11 is a device compliant with 1.8 V power-supply LVS UHS-I Standard, when receiving the CMD8 from the host 22, the memory device 24 can identify the command argument of 0100 b and copy the command argument of 0100 b into a response to the CMD8 to return to the host 22. Then when receiving the response to the CMD8 from the memory device 24, if the VCA=VHS, the host 22 can realize that the memory device 24 supports, in power supply, the 1.8 V power-supply LVS UHS-I Standard and determine that the memory device 24 can be used.

In contrast, because the memory device 23 of FIG. 11 is a 3.3 V power-supply card, the memory device 23 cannot operate with low power-supply voltage supply from the host 22, and thus no response is returned. Because no response to the CMD8 issued by it has come in, the host 22 can reject the memory device 23.

Since the VHS of the CMD8 can be set to three different values, different check patterns may be respectively set as shown in FIG. 12.

Figure 13:
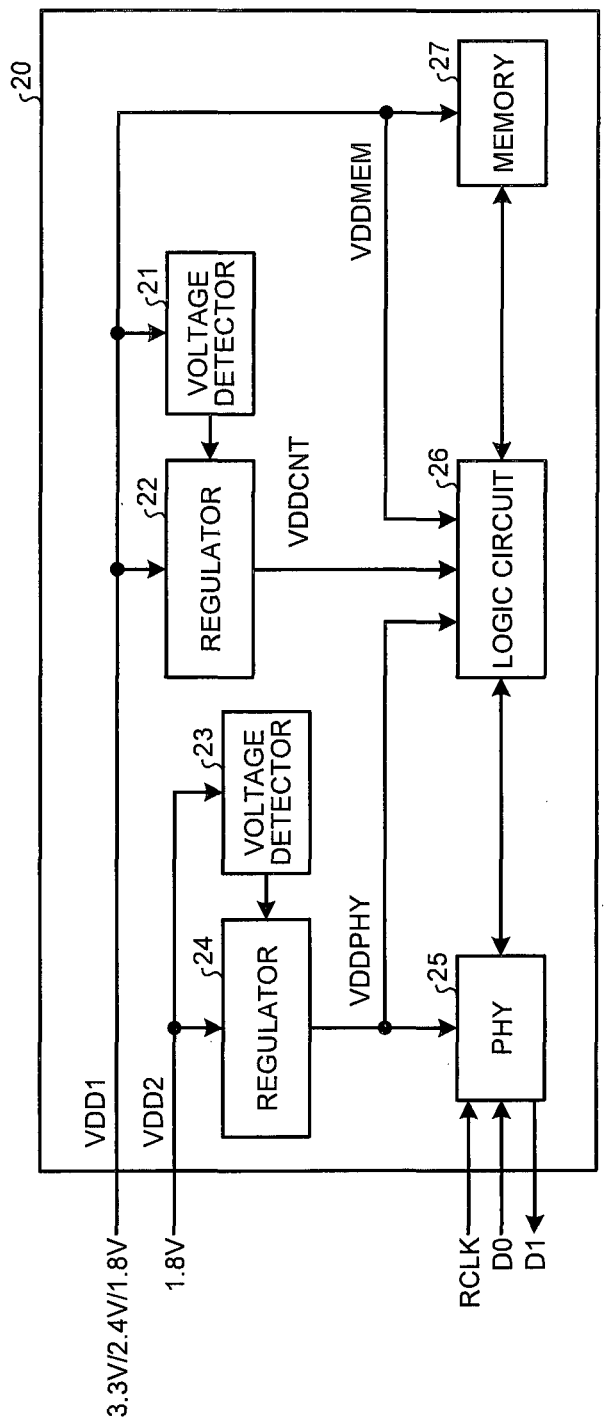
FIG. 13 is a block diagram showing an example configuration of the memory device according to the second embodiment.

FIG. 13 is a block diagram showing an example configuration of the memory device according to the second embodiment. FIG. 13 shows an example implementation of a 1.8 V power-supply LVS UHS-II SD card.

In FIG. 13, in an SD card 20, there is provided a voltage detector units 21, 23, regulators 22, 24, a physical layer 25, a logic circuit 26, and a memory 27. Further, in the SD card 20, two systems of power supply lines VDD1, VDD2 are provided. For the power supply voltage applied to the power supply line VDD1, for example, 3.3 V, 2.4 V, or 1.8 V can be selected. The power supply voltage applied to the power supply line VDD2 can be set at, e.g., 1.8 V.

The voltage detector unit 21 determines whether a power supply voltage VDDMEM with which the memory 27 is operable is applied to the power supply line VDD1. As the power supply voltage VDDMEM, for example, either 3.3 V, 2.4 V, or 1.8 V can be expected.

The regulator 22 generates a power supply voltage VDDCNT for the logic circuit 26 from the power supply voltage applied to the power supply line VDD1. The power supply voltage VDDCNT can be set to be within the range of, e.g., 1.2 V to 0.9 V.

The voltage detector unit 23 determines whether a power supply voltage from which a power supply voltage VDDPHY, with which an interface unit that communicates with the host via interface signals is operable, can be generated is applied to the power supply line VDD2. The power supply voltage VDDPHY can be set lower than the power supply voltage applied to the power supply line VDD2 and higher than the signal voltage. Because the signal voltage for LVDS has a swing of around 100 mV to 400 mV, the interface unit can operate with a power supply voltage of 0.9 V or higher. The power supply voltage VDDPHY can be set to be within the range of, e.g., 1.2 V to 0.9 V.

The regulator 24 generates the power supply voltage VDDPHY from the power supply voltage applied to the power supply line VDD2.

The physical layer 25 can constitute the interface unit that communicates with the host via interface signals. In this case, the physical layer 25 can constitute a UHS-II LDVS interface. The logic circuit 26 can constitute a controller that controls access to the memory 27. Note that the power supply voltage VDDCNT may be equal to or different from the power supply voltage VDDPHY. The power supply voltage VDDMEM is also supplied to the logic circuit 26 to connect to the memory 27.

For example, a NAND flash memory can be used as the memory 27, and the power supply voltage VDDMEM is supplied thereto.

A clock RCLK is supplied from the host to the SD card 20, and when an internal clock generated from the clock RCLK becomes stable, the host and the SD card 20 come to be able to communicate via interface signals. For the lane D0, the host outputs with the SD card 20 receiving as an input, and for the lane D1, the SD card 20 outputs with the host receiving as an input. Before the start of communication, EIDL is outputted onto both lanes D0, D1, indicating being in an idle state.

Then, the voltage detector unit 21 determines whether the power supply voltage VDDMEM with which the memory 27 is operable is applied to the power supply line VDD1. Further, the voltage detector unit 23 determines whether a power supply voltage from which the power supply voltage. VDDPHY, with which the physical layer 25 is operable, can be generated is applied to the power supply line VDD2. Then, if determining that they are operable with power supply via both the power supply lines VDD1, VDD2, then the interface signals indicate that the SD card can communicate with the host. At this time, in response to the lane D0 input becoming STB.L, outputting STB.L onto the lane D1 indicates to the host that the SD card 20 is operable and that initialization can be performed.

On the other hand, if determining that they are not operable with power supply via both the power supply lines VDD1, VDD2, then the interface signals indicate that the SD card cannot communicate with the host. At this time, in response to the lane D0 input becoming STB.L, outputting EIDL onto the lane D1 indicates to the host that the SD card 20 is not operable.

The host can ascertain whether the SD card 20 is operable with voltages applied to the power supply lines VDD1, VDD2 via the lane D1. That is, the host outputs STB.L onto the lane D0, and then after a given time elapses, if the lane D1 remains at EIDL, the host determines that the SD card 20 is not operable with the power supply voltages supplied. If not having received EIDL itself, the host determines that the SD card 20 does not have the UHS-II mode implemented. If the lane D1 becomes STB.L within the given time, the host determines that the SD card 20 can operate in the UHS-II mode and performs the initialization sequence.

As such, with UHS-II Standard, the support of the power supply voltage is not determined by exchanging commands, but the support of the power supply voltage can be determined with the levels of the lanes D0, D1, and thus, without a need to exchange commands, the determination can be simplified. Note that the power supply/signal voltage confirming command is still effective for firmware processing. Because the first and second embodiments are independent functions, the first embodiment as well as the second embodiment can be applied to the UHS-II card.

In hibernation (a low power consumption mode), the states in the controller are backed up with use of the power supply voltage VDDPHY. Hence, the states in the controller are maintained without the power supply voltage VDDCNT being supplied, and when the power supply voltage VDDCNT is supplied, operation can be continued.

FIG. 14 is a diagram showing compatibility between the host apparatus and the memory device according to the second embodiment.

In FIG. 14, whether it is an LVS UHS-I card or an LVS UHS-II card, a card adapted for the 1.8 V power supply voltage can be used only in combination with a host adapted for the 1.8 V power supply voltage, and a card adapted for the 3.3 V power supply voltage can be used only in combination with a host adapted for the 3.3 V power supply voltage.

Third Embodiment

Figure 15:
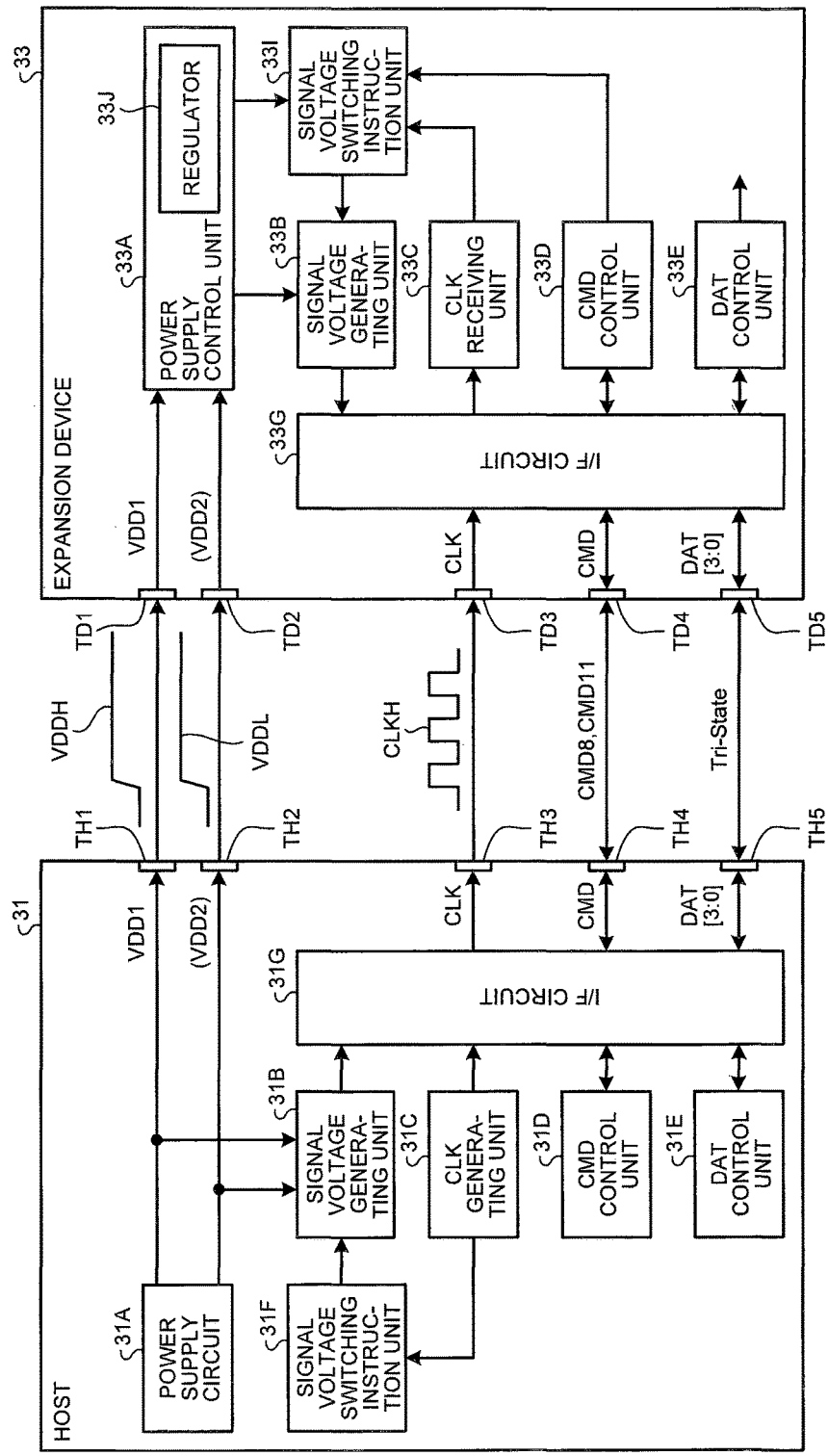
FIG. 15 is a block diagram showing the initialization start operation of a host apparatus and an expansion device according to a third embodiment when neither of them is adapted for LVS.
Figure 16:
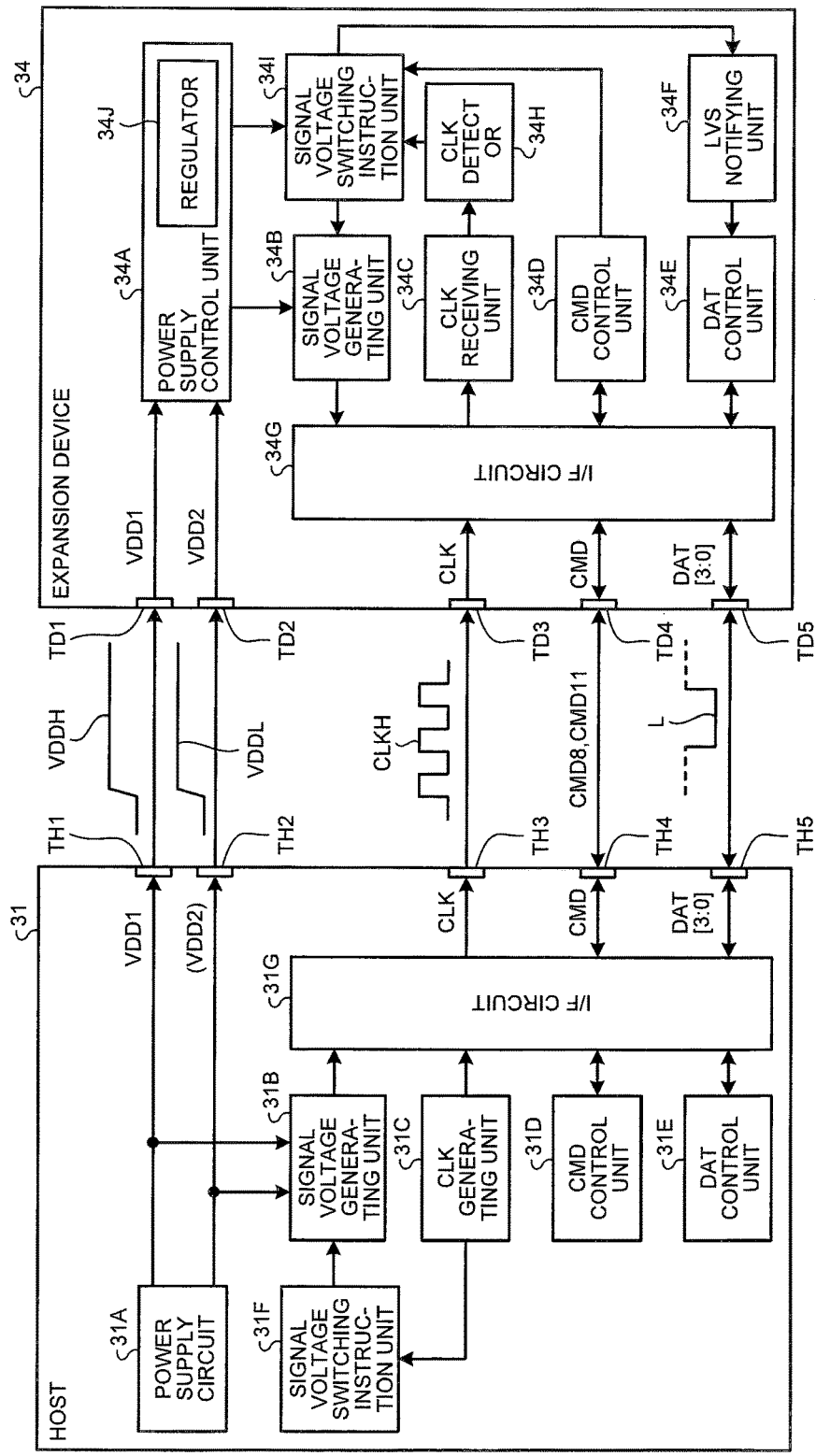
FIG. 16 is a block diagram showing the initialization start operation of a host apparatus and an expansion device according to the third embodiment when the expansion device is adapted for LVS.
Figure 17:
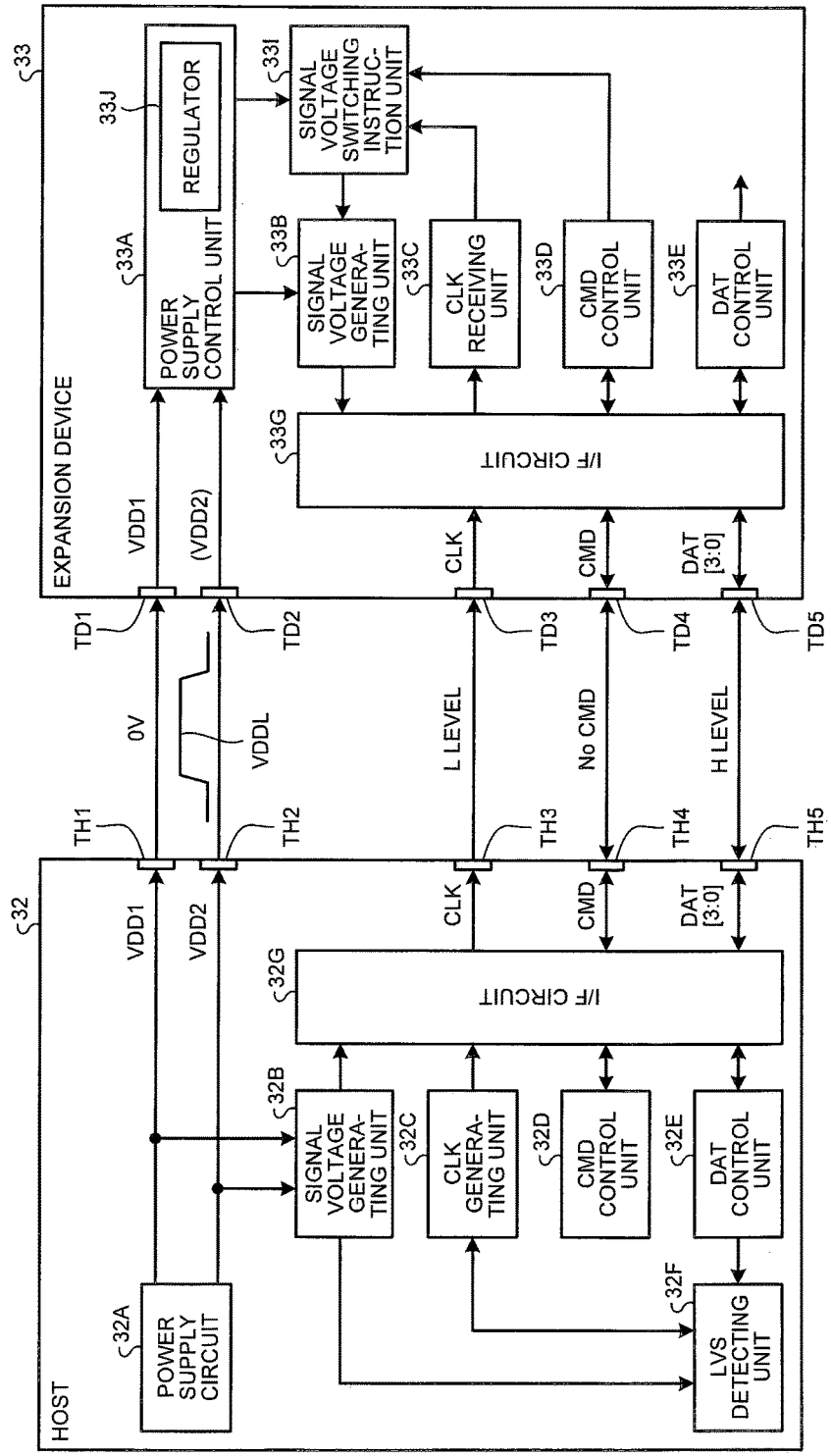
FIG. 17 is a block diagram showing the initialization start operation of a host apparatus and an expansion device according to the third embodiment when the host apparatus is adapted for LVS.
Figure 18:
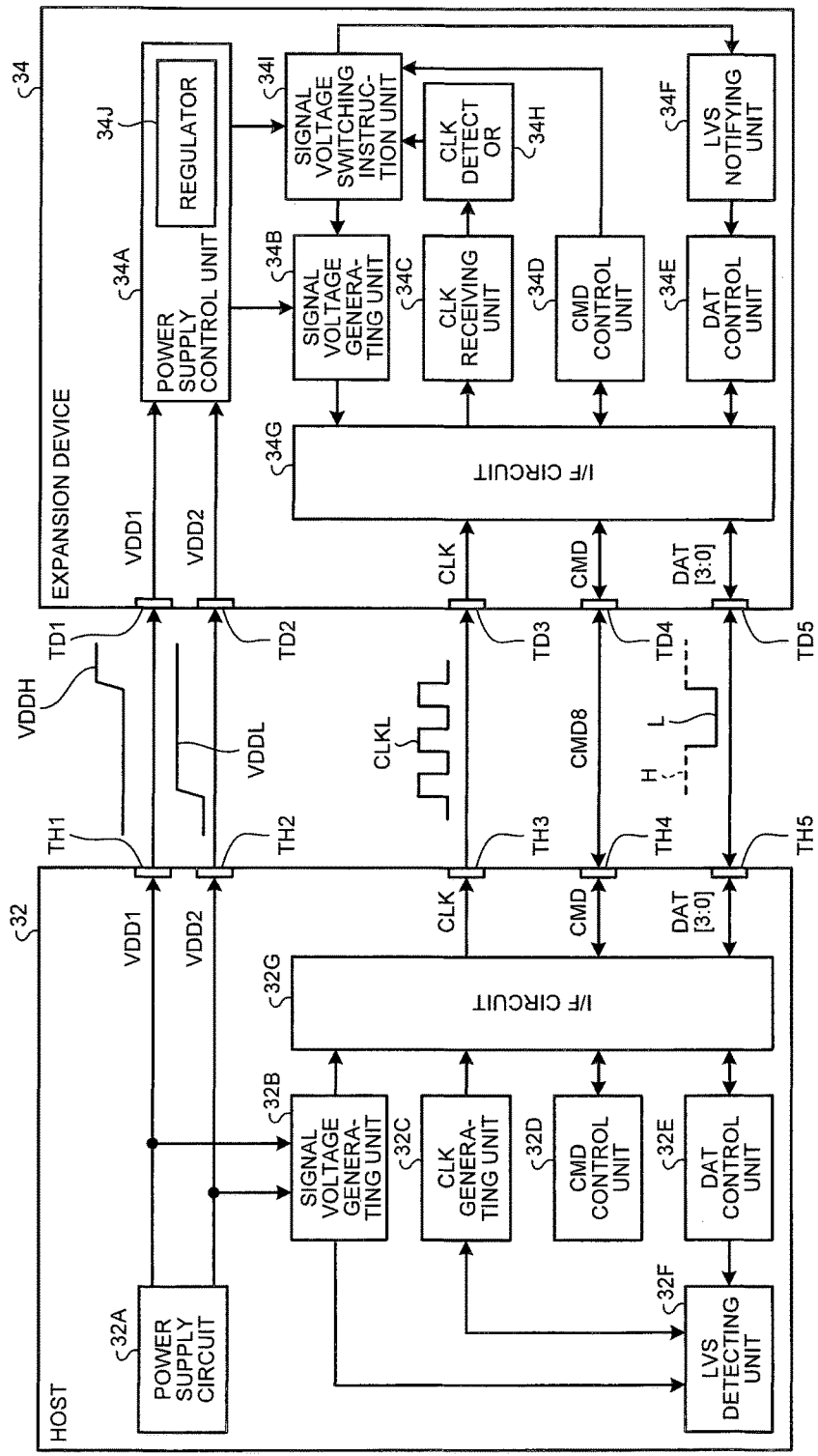
FIG. 18 is a block diagram showing the initialization start operation of a host apparatus and an expansion device according to the third embodiment when both of them are adapted for LVS.

FIG. 15 is a block diagram showing the initialization start operation of a host apparatus and an expansion device according to the third embodiment when neither of them is adapted for LVS; FIG. 16 is a block diagram showing the initialization start operation of a host apparatus and an expansion device according to the third embodiment when the expansion device is adapted for LVS; FIG. 17 is a block diagram showing the initialization start operation of a host apparatus and an expansion device according to the third embodiment when the host apparatus is adapted for LVS; and FIG. 18 is a block diagram showing the initialization start operation of a host apparatus and an expansion device according to the third embodiment when both of them are adapted for LVS.

In FIGS. 15 to 18, hosts 31, 32 send commands to expansion devices 33, 34 in order to initialize the expansion devices and determine the operation according to responses from the expansion devices 33, 34. The expansion devices 33, 34 are configured to be attachable to and detachable from the hosts 31, 32 and can expand the functions of the hosts 31, 32. The expansion devices 33, 34 may be SD cards or SDIO cards. In the embodiment below, description will be made supposing that the host 31 and the expansion device 33 support only high voltage signals, that the host 32 supports only low voltage signals, and that the expansion device 34 supports both low voltage signals and high voltage signals. Power supply terminals TH1, TH2, a clock terminal TH3, a command terminal TH4, and data terminals TH5 are provided in each of the hosts 31, 32. Power supply terminals TD1, TD2, a clock terminal TD3, a command terminal TD4, and data terminals TD5 are provided in each of the expansion devices 33, 34. By connecting power supply terminals TH1, TD1, a power supply line VDD1 can be formed. By connecting power supply terminals TH2, TD2, a power supply line VDD2 can be formed. By connecting clock terminals TH3, TD3, a clock line CLK can be formed. By connecting command terminals TH4, TD4, a command line CMD can be formed. By connecting data terminals TH5, TD5, data lines DAT[3:0] can be formed. The host 31 and the expansion device 33 can communicate with use of high voltage signals, and the host 32 and the expansion device 34 can communicate with use of low voltage signals. For example, high voltage signals of 3.3 V and low voltage signals of 1.8 V are used. Signals are transmitted via the clock line CLK, data lines DAT[3:0], and command line CMD, and power supplies, which are not signals, are supplied via the power supply lines VDD1, VDD2. Here, the host 31 can supply a high power supply voltage VDDH to the expansion devices 33, 34 via the power supply line VDD1. This high power supply voltage VDDH can be set at, e.g., 3.3 V. The host 31 can comprise the power supply line VDD2 as an option. The power supply line VDD2 can supply a low power supply voltage VDDL to the expansion devices 33, 34. This low power supply voltage VDDL can be set at, e.g., 1.8 V. The host 31 supplies a clock CLKH to the expansion devices 33, 34 via the clock line CLK. Here, the host 31 starts supplying the high power supply voltage VDDH and then outputs the clock CLKH. The expansion device 34 can select either high voltage signals or low voltage signals as its input voltage level and, if detecting the clock while the high power supply voltage VDDH is applied thereto, selects high voltage signals as the input voltage level. Then, where the expansion device 33 or 34 is compliant with UHS-II Standard, the process (voltage switching sequence) of switching from high voltage signals to low voltage signals is executed during initialization according to instructions by CMD8 and CMD11, and the initialization sequence is continued with that low-voltage signal level.

The host 32 can supply the high power supply voltage VDDH and the low power supply voltage VDDL to the expansion device 33 or 34 via two systems of the power supply lines VDD1, VDD2. Further, the host 32 can supply a clock CLKL to the expansion device 34 via the clock line CLK. The host 32 starts outputting the low power supply voltage VDDL and then outputs the clock CLKL and then starts supplying the high power supply voltage VDDH, thereby indicating that the clock is at a low voltage level. The host and expansion device adapted for LVS can identify whether low voltage signals are supported, using part of data lines DAT[3:0]. When receiving the low power supply voltage VDDL, the expansion device 34 drives anyone of lines DAT[3:0], e.g., DAT[0] to be at a low (L) level. Because conventional devices do not drive it, by referring to the level of DAT[0], it can be identified whether the device is adapted for LVS. With data lines DAT[3:0] being pulled up, when detecting that the voltage level of data line DAT[0] is at, e.g., the H level, the host 32 realizes that the expansion device connected thereto is not adapted for LVS and does not output the clock CLKL, but stops initialization. When detecting that the voltage level of DAT[0] is at the L level, the host 32 can output the clock CLKL.

The expansion device 34 can select either high voltage signals or low voltage signals as its input voltage level and, if detecting the clock while the high power supply voltage VDDH is applied thereto, selects high voltage signals as the input voltage level (recognizing as CLKH) and, if detecting the clock while the low power supply voltage VDDL is applied thereto without the high power supply voltage VDDH being applied, can select low voltage signals as the input voltage level (recognizing as CLKL). The expansion device 34 can select either the H level or the L level also for the voltage level of the command line CMD and data lines DAT[3:0], but selects the same level as that of the clock.

A power supply circuit 31A, a signal voltage switching instruction unit 31F, a signal voltage generating unit 31B, a CLK generating unit 31C, a CMD control unit 31D, a DAT control unit 31E, and an I/F unit 31G are provided in the host 31. The power supply circuit 31A can supply the high power supply voltage VDDH. Further, the power supply circuit 31A can supply the low power supply voltage VDDL as an option. The signal voltage switching instruction unit 31F can instruct to switch the signal level from a high voltage to a low voltage in an initialization sequence. The signal voltage generating unit 31B can set the signal level at the high voltage or the low voltage. The CLK generating unit 31C can generate the clock CLKH. The CMD control unit 31D can issue whatever command the host 31 generates and receive the response to that command. The DAT control unit 31E can set the voltage levels of data lines DAT[3:0] at the H level, L level, or high impedance (tristate). The I/F unit 31G can transmit a clock via the clock line CLK and transmit a command and receive a response via the command line CMD.

A power supply circuit 32A, a signal voltage generating unit 32B, a CLK generating unit 32C, a CMD control unit 32D, a DAT control unit 32E, an LVS detecting unit 32F, and an I/F unit 32G are provided in the host 32. The power supply circuit 32A can supply the high power supply voltage VDDH and the low power supply voltage VDDL in parallel. The signal voltage generating unit 32B can set the signal level at the low voltage. The CLK generating unit 32C can generate the clock CLKL. The CMD control unit 32D can issue whatever command the host 32 generates and receive the response to that command. The DAT control unit 32E can set the voltage levels of data lines DAT[3:0] at the H level, L level, or high impedance (tristate). The LVS detecting unit 32F can detect whether the voltage levels of all or some signals of data lines DAT[3:0] are at the L level. The I/F unit 32G can transmit a clock via the clock line CLK and transmit a command and receive a response via the command line CMD.

A power supply control unit 33A, a signal voltage generating unit 33B, a CLK receiving unit 33C, a CMD control unit 33D, a DAT control unit 33E, an I/F unit 33G, and a signal voltage switching instruction unit 33I are provided in the expansion device 33. A regulator 33J is provided in the power supply control unit 33A. The power supply control unit 33A can control the power supply voltage. The signal voltage switching instruction unit 33I can switch between signal voltages according to a command to switch the signal level from a high voltage to a low voltage in an initialization sequence. The signal voltage generating unit 33B can set the signal level at the high voltage or the low voltage. The CLK receiving unit 33C can receive the clock CLKH. The CMD control unit 33D can receive whatever command and generate and send a response to that command. The DAT control unit 33E can set the voltage levels of data lines DAT[3:0] at the H level, L level, or high impedance (tristate). The I/F unit 33G can receive a clock via the clock line CLK and receive a command and transmit a response via the command line CMD. The regulator 33J can generate the low power supply voltage VDDS from the high power supply voltage VDDH.

A power supply control unit 34A, a signal voltage generating unit 34B, a CLK receiving unit 34C, a CMD control unit 34D, a DAT control unit 34E, an LVS notifying unit 34F, an I/F unit 34G, a CLK detecting unit 34H, and a signal voltage switching instruction unit 34I are provided in the expansion device 34. A regulator 34J is provided in the power supply control unit 34A. The power supply control unit 34A can control the power supply voltage. The signal voltage switching instruction unit 34I can switch the signal level from a high voltage to a low voltage in an initialization sequence. The signal voltage generating unit 34B can set the signal level at the high voltage or the low voltage. The CLK receiving unit 34C can receive the clock CLKL. The CMD control unit 34D can receive whatever command and generate and send a response to that command. The DAT control unit 34E can set the voltage levels of data lines DAT[3:0] at the H level, L level, or high impedance (tristate). The LVS notifying unit 34F instructs the DAT control unit 34E to output the L level onto, e.g., tristate data line DAT[0] when VDD2 is supplied, thereby performing control to indicate that the device 34 is adapted for LVS. It can notify the host that the device 34 is adapted for a low-voltage signal level. The I/F unit 34G can receive a clock via the clock line CLK and receive a command and transmit a response via the command line CMD. The CLK detecting unit 34H can detect the presence/absence of the clock CLKL received via the I/F unit 34G. The regulator 34J can generate the low power supply voltage VDDS from the high power supply voltage VDDH.

Note that the power supply circuits 31A, 32A, power supply control units 33A, 34A, and signal voltage generating units 31B to 34B can be constituted by analog circuits and that the signal voltage switching instruction units 31F, 33I, 34I, CLK generating units 31C to 34C, CMD control units 31D to 34D, DAT control units 31E to 34E, I/F units 31G to 34G, CLK detecting unit 34H, LVS detecting unit 32F, and LVS notifying unit 34F can be constituted by logic circuits. The CMD control units 31D to 34D and DAT control units 31E to 34E may be implemented by firmware processing by a processor.

Suppose that the expansion device 33 is connected to the host 31 as sown in FIG. 15. At this time, the high power supply voltage VDDH is supplied from the host 31 to the expansion device 33. Further, the low power supply voltage VDDL is supplied as an option from the host 31 to the expansion device 33. Yet further, the clock CLKH is supplied from the host 31 to the expansion device 33. The voltage levels of data lines DAT[3:0] are set to be tristate, but are pulled up in the host 31. After a predetermined number of pulses of the clock CLKH are supplied, a command CMD8 is transmitted from the host 31 to the expansion device 33. This command CMD8 designates the high signal-voltage level that is currently used by the host 31. Then a response of the high signal-voltage level in response to the command CMD8 is transmitted from the expansion device 33 to the host 31. When the host 31 receives the response, the host 31 determines whether the continuation of initialization is possible. In the case of being compliant with UHS-I Standard, a command CMD11 is transmitted from the host 31 to the expansion device 33. Thus, in the expansion device 33, the process (voltage switching sequence) of switching from high voltage signals to low voltage signals is executed during initialization, and the initialization sequence is continued with that low-voltage signal level.

In contrast, suppose that the expansion device 34 is connected to the host 31 as sown in FIG. 16. At this time, the high power supply voltage VDDH is supplied from the host 31 to the expansion device 34. Further, the clock CLKH is supplied from the host 31. Here, after starting outputting the high power supply voltage VDDH, the host 31 outputs the clock CLKH. The voltage levels of data lines DAT[3:0] are set to be tristate. If detecting the clock CLKH while the high power supply voltage VDDH is applied thereto, the expansion device 34 selects high voltage signals as the input voltage level. Then, after a predetermined number of pulses of the clock CLKH are supplied, a command CMD8 is transmitted from the host 31 to the expansion device 34. This command CMD8 designates the high signal-voltage level that is currently used by the host 31. Then a response of the high signal-voltage level in response to the command CMD8 is transmitted from the expansion device 34 to the host 31. When the host 31 receives the response, the host 31 determines whether the continuation of initialization is possible. In the case of being compliant with UHS-I Standard, a command CMD11 is transmitted from the host 31 to the expansion device 34. Thus, in the expansion device 34, the process (voltage switching sequence) of switching from high voltage signals to low voltage signals is executed during initialization, and the initialization sequence is continued with that low-voltage signal level. Hence, also where the expansion device 34 supports low voltage signals, the expansion device 34 can maintain compatibility with the host 31 designating the high signal-voltage level. The low power supply voltage VDDL may be or may not be supplied from the host 31 to the expansion device 34. Although having a function of indicating whether it is adapted for LVS using data line DAT0, the expansion device 34 does not drive data line DAT0 to be at the L level, but keeps it tristate when the high power supply voltage VDDH is applied. If determining that the host is not adapted for LVS, the expansion device 34 may keep DAT0 tristate because that host does not refer to DAT0.

In contrast, suppose that the expansion device 33 is connected to the host 32 as sown in FIG. 17. At this time, for example, data lines DAT[3:0] are pulled up in the host 32, and hence the voltage level on data line DAT0 is kept at the H level, while the expansion device 33 keeps data line DAT0 tristate. By detecting data line DAT0 being at the H level, the host 32 can determine that the expansion device 33 does not support low voltage signals (is not adapted for LVS). Hence, the host 32 can determine whether the expansion device 33 supports low voltage signals before exchanging commands with the expansion device 33, so that ascertaining the support of the high/low signal voltage can be speeded up. After starting supplying the low power supply voltage VDDL to the expansion device 33, when detecting the voltage level on data line DAT0 being at the H level before outputting the clock CLKL, the host 32 realizes that the expansion device 33 is not adapted for LVS and rejects it. The host 32 stops outputting the low power supply voltage VDDL because of stopping the initialization. Further, the host 32 needs not to output the clock CLKL and a command to a device not adapted for LVS while not supplying the high power supply voltage VDDH. The clock CLKL can be prevented from being supplied to the expansion device 33 before the high power supply voltage VDDH is supplied, and thus the expansion device 33 can be protected (if a H-level signal is outputted before power supply is supplied, a large current will flow through the signal line, so that the device may be damaged).

In contrast, suppose that the expansion device 34 is connected to the host 32 as sown in FIG. 18. At this time, the low power supply voltage VDDL is supplied from the host 32 to the expansion device 34. Further, for example, data lines DAT[3:0] are pulled up in the host 32. In the expansion device 34, if the low power supply voltage VDDL is applied before the high power supply voltage VDDH is applied, the voltage level on data line DAT0 is set at the L level. Then when detecting the voltage level on data line DAT0 being at the L level, the host 32 outputs the clock CLKL to the expansion device 34. Then if detecting the clock CLKL while the low power supply voltage VDDL is applied thereto without the high power supply voltage VDDH being applied, the expansion device 34 selects low voltage signals, and the initialization sequence is performed with the low-voltage signal level. Further, after a given time elapses from when the clock CLKL is outputted, the high power supply voltage VDDH is supplied from the host 32 to the expansion device 34.

Here, if detecting the clock CLKL while the low power supply voltage VDDL is applied thereto without the high power supply voltage VDDH being applied, the expansion device 34 can determine that the host 32 is requesting connection with low voltage signals. Further, by detecting the voltage level on data line DAT0, the host 32 can determine that the expansion device 34 supports low voltage signals.

As an option, if the host 32 issues a command CMD8 with the low-voltage signal level to the expansion device 34 with the argument of the command CMD8 being set to indicate being the low-voltage signal level, the expansion device 34 can return a response of the low-voltage signal level to the command CMD8 to the host 32. At this time, the command CMD8 may have the contents shown in FIG. 4 or the contents shown in FIG. 12. The support of the voltage level and signal level can be ascertained in detail by using this command CMD8.

Figure 19:
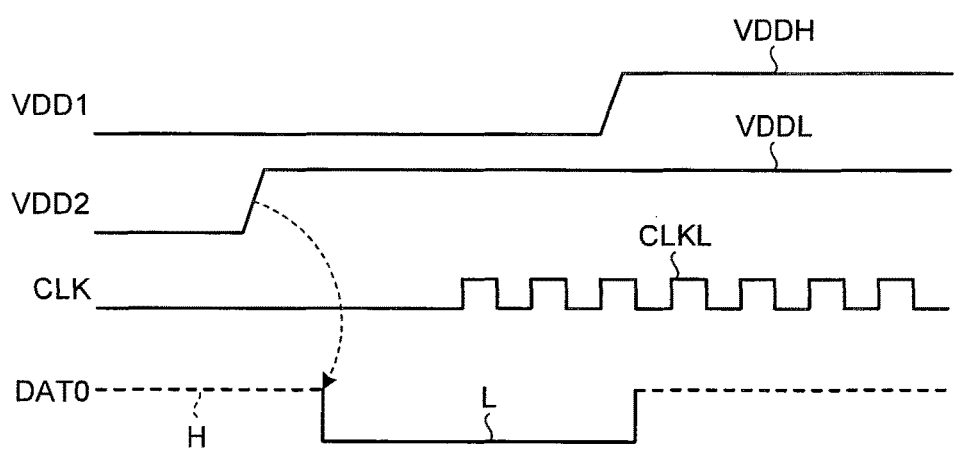
FIG. 19 is a timing chart showing the waveforms of power supply voltages, a clock, and data at the initialization start operation of the host apparatus and expansion device of FIG. 18.

FIG. 19 is a timing chart showing the waveforms of power supply voltages, a clock, and data at the initialization start operation of the host apparatus and expansion device of FIG. 18.

In FIG. 19, first, the low power supply voltage VDDL starts to be supplied from the host 32 to the expansion device 34. Because data lines DAT[3:0] are pulled up in the host 32, where the data lines are tristate, it is realized that the voltage levels are at the H level when they are read. Then, in the expansion device 34, if the low power supply voltage VDDL is applied before the high power supply voltage VDDH is applied, the voltage level on data line DAT0 is set at the L level. Hence, by detecting the voltage level on data line DAT0 being at the L level, the host 32 can ascertain that the expansion device 34 supports low voltage signals. Hence, the host 32 outputs the clock CLKL and, after a given time elapses, starts to apply the high power supply voltage VDDH. When detecting the clock CLKL or the high power supply voltage VDDH being applied, the expansion device 34 makes DAT0 return to the tristate.

Further, the expansion device 34 can detect the clock CLKL while the low power supply voltage VDDL is applied thereto without the high power supply voltage VDDH being applied and select low voltage signals as the input voltage level. Although not shown in the figure, when detecting the voltage level on data line DAT0 being at the H level, the host 32 realizes that the expansion device 34 does not support low voltage signals and does not output the clock CLKL, but can reject the expansion device 34.

Figure 20:
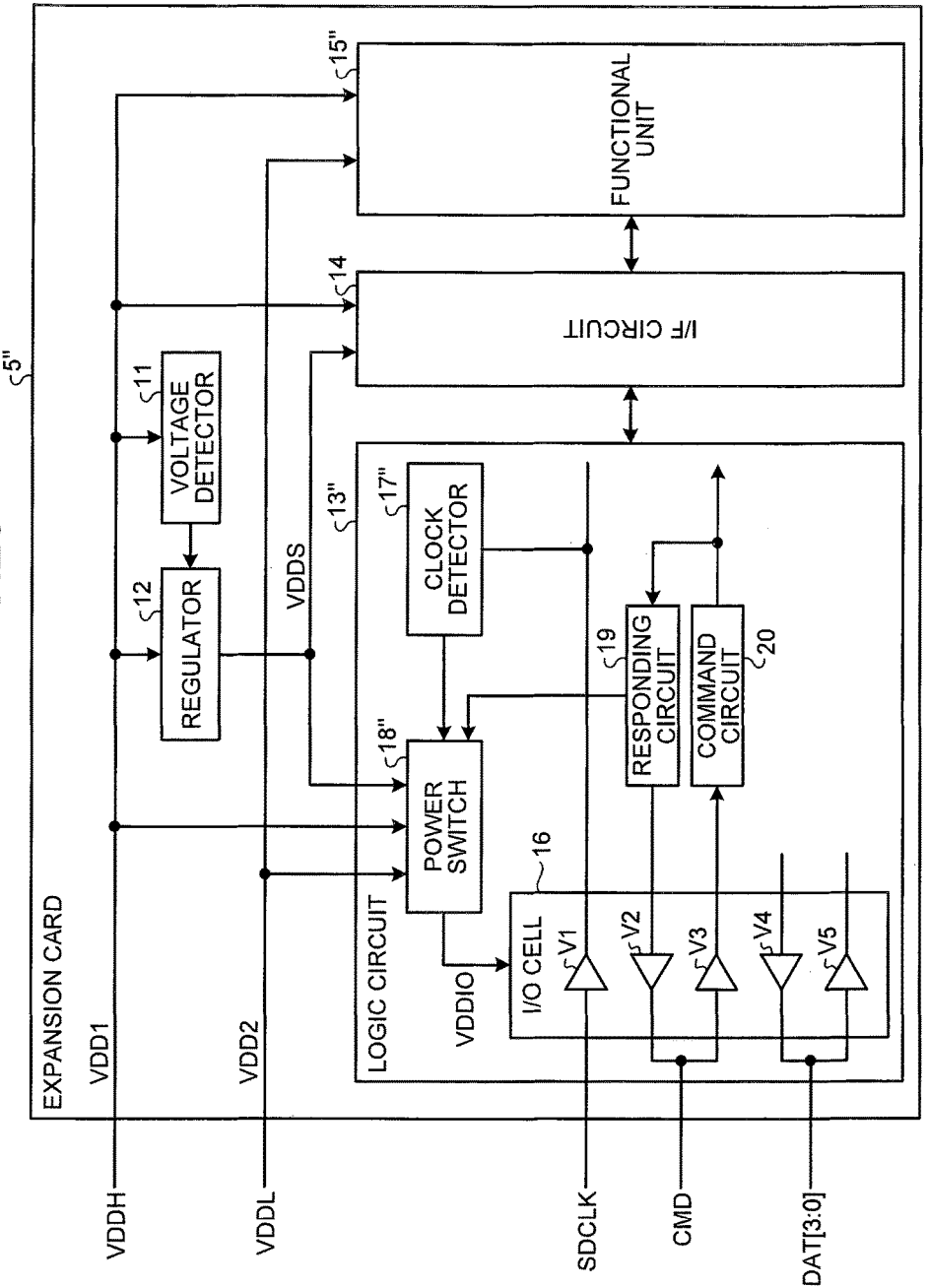
FIG. 20 is a block diagram showing an example configuration of the expansion device according to the third embodiment.

FIG. 20 is a block diagram showing an example configuration of the expansion device according to the third embodiment.

In FIG. 20, in an expansion card 5", there is provided a logic circuit 13" and a functional unit 15" instead of the logic circuit 13 and the memory 15 in FIG. 2. The functional unit 15" may be the memory 15 in FIG. 2, or GPS, a camera, Wi-Fi, an FM radio, Ethernet, a bar code reader, Bluetooth, or the like. The high power supply voltage VDDH is applied to the expansion card 5" via the power supply line VDD1 while the low power supply voltage VDDL is applied via the power supply line VDD2. In the logic circuit 13", there are provided a clock detector 17" and a power switch 18" instead of the clock swing detector unit 17 and power switch 18 in FIG. 2. The clock detector 17" can detect the presence/absence of the clock SDCLK received via the I/O cell 16.

The power switch 18" selects one of the high power supply voltage VDDH, low power supply voltage VDDL, and the regulator output VDDS. The power switch 18" switches the cell power supply VDDIO according to whether high voltage signals or low voltage signals are selected to supply to the I/O cell 16. That is, when detecting the clock SDCLK while the high power supply voltage VDDH is applied, the power switch 18" switches the cell power supply VDDIO so as to select high voltage signals as the input voltage level. Then, after the voltage switching sequence is executed during initialization due to a command CMD11, the cell power supply VDDIO is switched so as to select low voltage signals as the input voltage level.

On the other hand, when detecting the clock SDCLK while the low power supply voltage VDDL is applied thereto without the high power supply voltage VDDH being applied, the cell power supply VDDIO is switched so as to select low voltage signals as the input voltage level.

Figure 21:
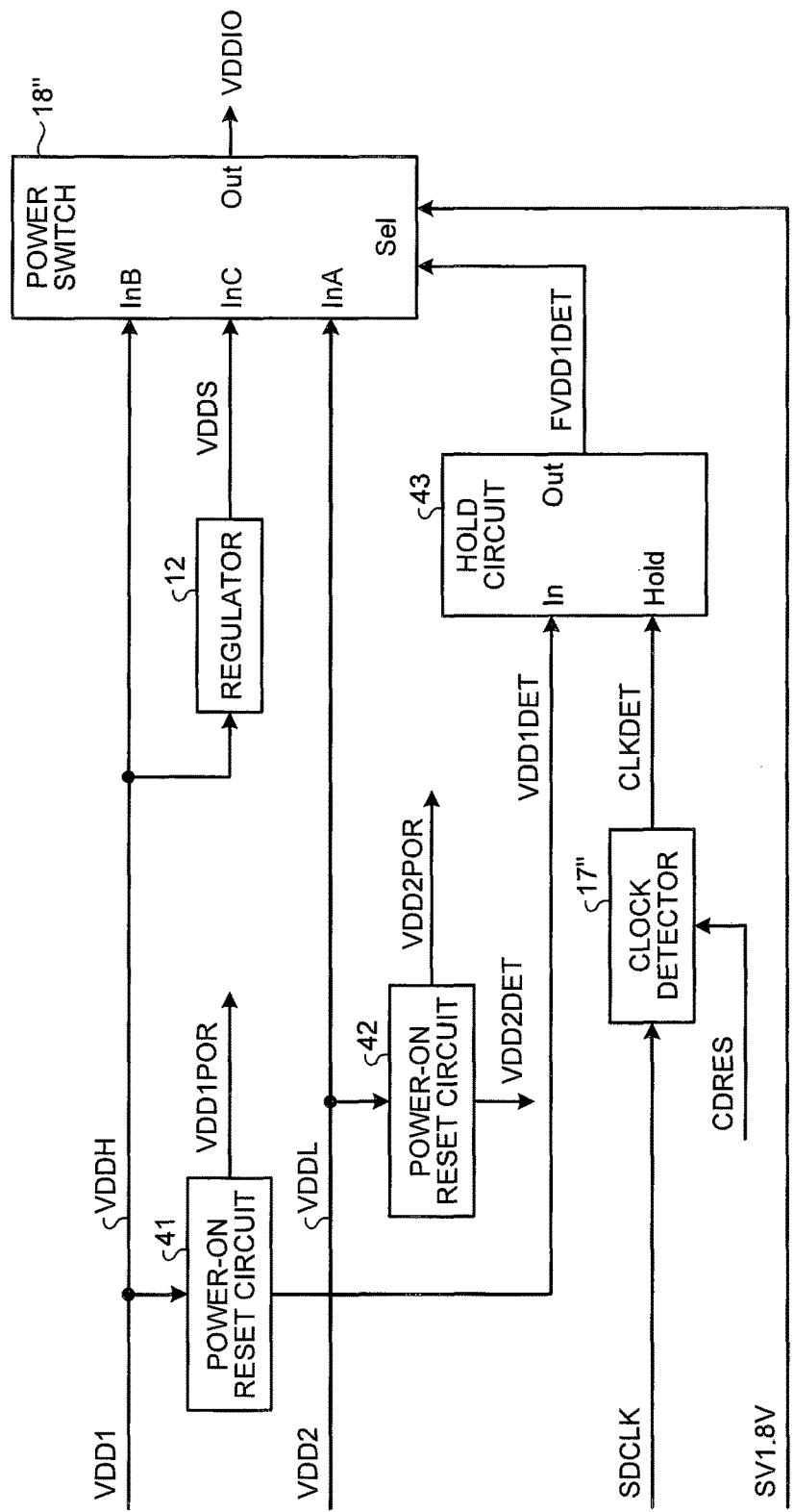
FIG. 21 is a block diagram showing a specific example of the front stage of the expansion device of FIG. 20.

FIG. 21 is a block diagram showing a specific example of the front stage of the expansion device of FIG. 20. In the configuration of FIG. 21, power-on reset circuits 41, 42 and a hold circuit 43 are added to the configuration of FIG. 20. The power-on reset circuit 41 can detect the high power supply voltage VDDH. The power-on reset circuit 42 can detect the low power supply voltage VDDL. The clock detector 17" outputs a detection signal CLKDET when detecting the clock SDCLK and is reset by a reset signal CDRES. At this time, the conditions for the reset are that VDD1DET=0 and VDD2POR=1 or that VDD2DET=0 and VDD1POR=1. When SV1.8V=0 and FVDD1DET=0, the power switch 18" selects InA and, when SV1.8V=0 and FVDD1DET=1, selects InB and, when SV1.8V=1, selects InC. When the voltage switching sequence is executed according to the command CMD11, the SV1.8V goes from 0 to 1. In the hold circuit 43, the detection signal FVDD1DET is at the same level as the detection signal VDD1DET when Hold=0 and, when Hold=1, the level of the signal FVDD1DET is held without being influenced by change in the detection signal VDD1DET.

Figure 22:
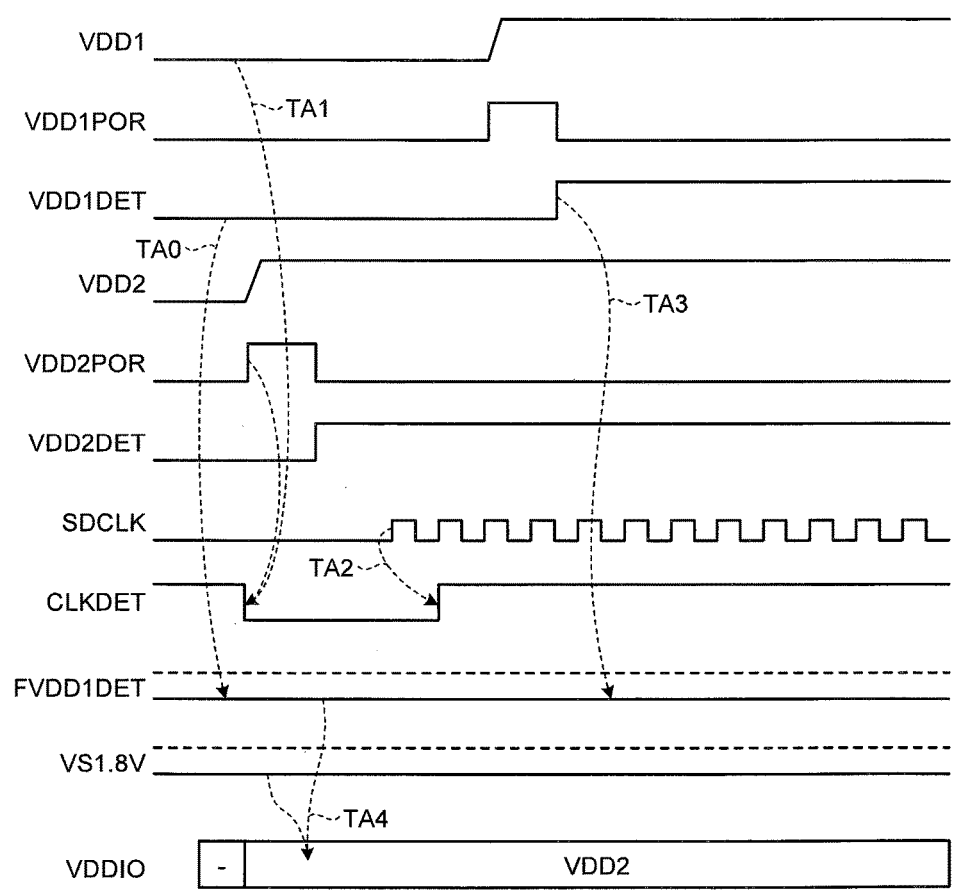
FIG. 22 is a timing chart showing the voltage waveforms of the parts of the expansion device of FIG. 21 at the initialization start operation when the host apparatus is adapted for LVS.

FIG. 22 is a timing chart showing the voltage waveforms of the parts of the expansion device of FIG. 21 at the initialization start operation when the host apparatus is adapted for LVS.

In FIG. 22, before the level on the power supply line VDD1 has risen, FVDD1DET is set at 0 in the hold circuit 43 (TA0). In the power-on reset circuit 42, on the rise of the level on the power supply line VDD2, the reset signal VDD2POR and the detection signal VDD2DET are generated. In the clock detector 17", when VDD1DET=0 and VDD2POR=1, the detection signal CLKDET is reset (TA1). Then when the clock SDCLK is detected, the detection signal CLKDET is generated (TA2). In the hold circuit 43, when the detection signal CLKDET is detected, the value of the detection signal VDD1DET starts to be held as the detection signal FVDD1DET. Hence, although VDD1DET becomes 1, FVDD1DET remains at 0 (TA3). When SV1.8V=0 and FVDD1DET=0, the power switch 18" selects InA, and the level on the power supply line VDD2 is selected for the cell power supply VDDIO (TA4). That is, the expansion device starts up in the LVS mode.

Figure 23:
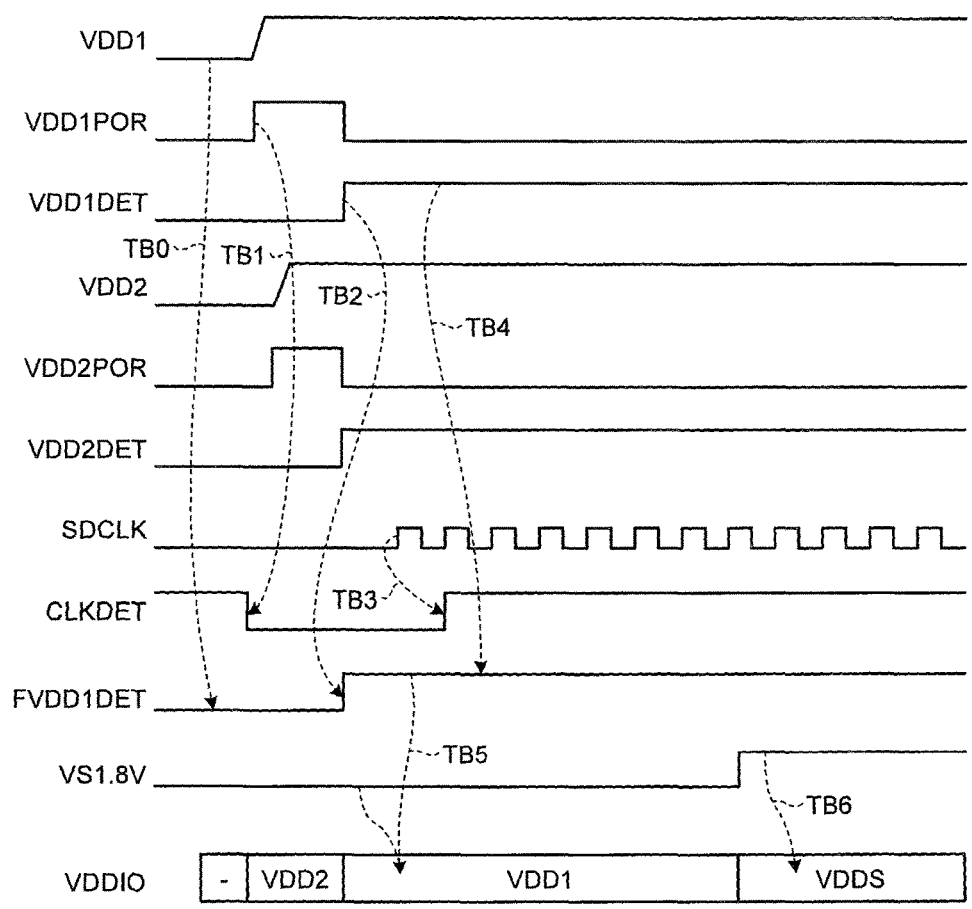
FIG. 23 is a timing chart showing the voltage waveforms of the parts of the expansion device of FIG. 21 at the initialization start operation when the host apparatus is not adapted for LVS.

FIG. 23 is a timing chart showing the voltage waveforms of the parts of the expansion device of FIG. 21 at the initialization start operation when the host apparatus is not adapted for LVS.

In FIG. 23, before the level on the power supply line VDD1 has risen, FVDD1DET is set at 0 in the hold circuit 43 (TB0). In the power-on reset circuit 41, on the rise of the level on the power supply line VDD1, the reset signal VDD1POR and the detection signal VDD1DET are generated. In the power-on reset circuit 42, on the rise of the level on the power supply line VDD2, the reset signal VDD2POR and the detection signal VDD2DET are generated. In the clock detector 17", the detection signal CLKDET is reset by the reset signal VDD1POR or VDD2POR (TB1). When the detection signal VDD1DET is generated, FVDD1DET is set at 1 in the hold circuit 43 (TB2). Then when the clock SDCLK is detected, the detection signal CLKDET is generated (TB3). In the hold circuit 43, when the detection signal CLKDET is detected, the value of the detection signal VDD1DET starts to be held as the detection signal FVDD1DET, so that FVDD1DET remains at 1 (TB4). When SV1.8V=0 and FVDD1DET=1, InB is selected, and the level on the power supply line VDD1 is selected for the cell power supply VDDIO (TB5). That is, the expansion device starts up in the high voltage signal mode. When the expansion device switches to the low voltage signal mode according to the command CMD11, SV1.8V becomes 1, so that the low power supply voltage VDDS is selected for the cell power supply VDDIO (TB6). That is, the expansion device switches to the UHS-I mode.

Fourth Embodiment

Figure 24:
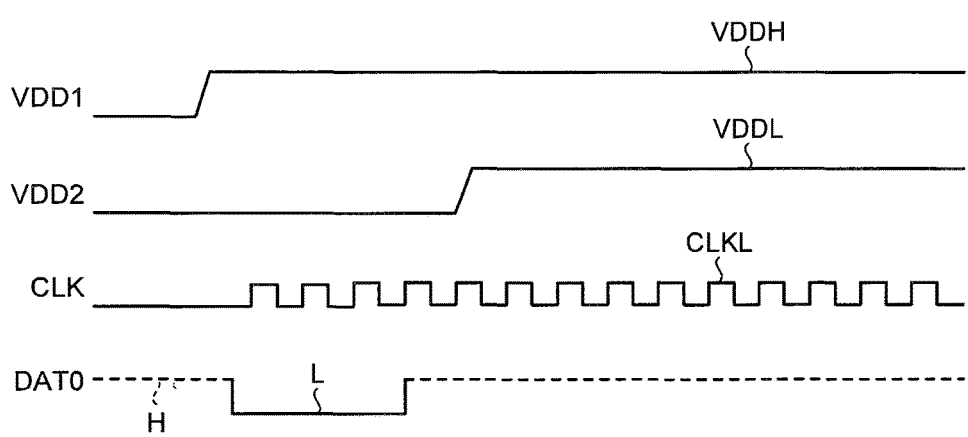
FIG. 24 is a timing chart showing the waveforms of power supply voltages and a clock at the initialization start operation of a host apparatus and expansion device according to a fourth embodiment.

FIG. 24 is a timing chart showing the waveforms of power supply voltages and a clock at the initialization start operation of a host apparatus and expansion device according to the fourth embodiment.

In FIG. 24, after the high power supply voltage VDDH is outputted from the host to the expansion device, the clock CLKL is outputted, and after the clock CLKL is outputted, the low power supply voltage VDDL is outputted. Further, the voltage level of data line DAT0 is set at the H level by the host. Then if the high power supply voltage VDDH is applied before the clock CLKL is detected, the expansion device sets the voltage level of data line DAT0 at the L level. Thus, the host can ascertain whether the expansion device supports low voltage signals before outputting the clock CLKL. After ascertaining whether the expansion device supports low voltage signals, the host can output the clock CLKL. The expansion device can ascertain whether the host supports low voltage signals by detecting the low power supply voltage VDDL.

Fifth Embodiment

Figure 25:
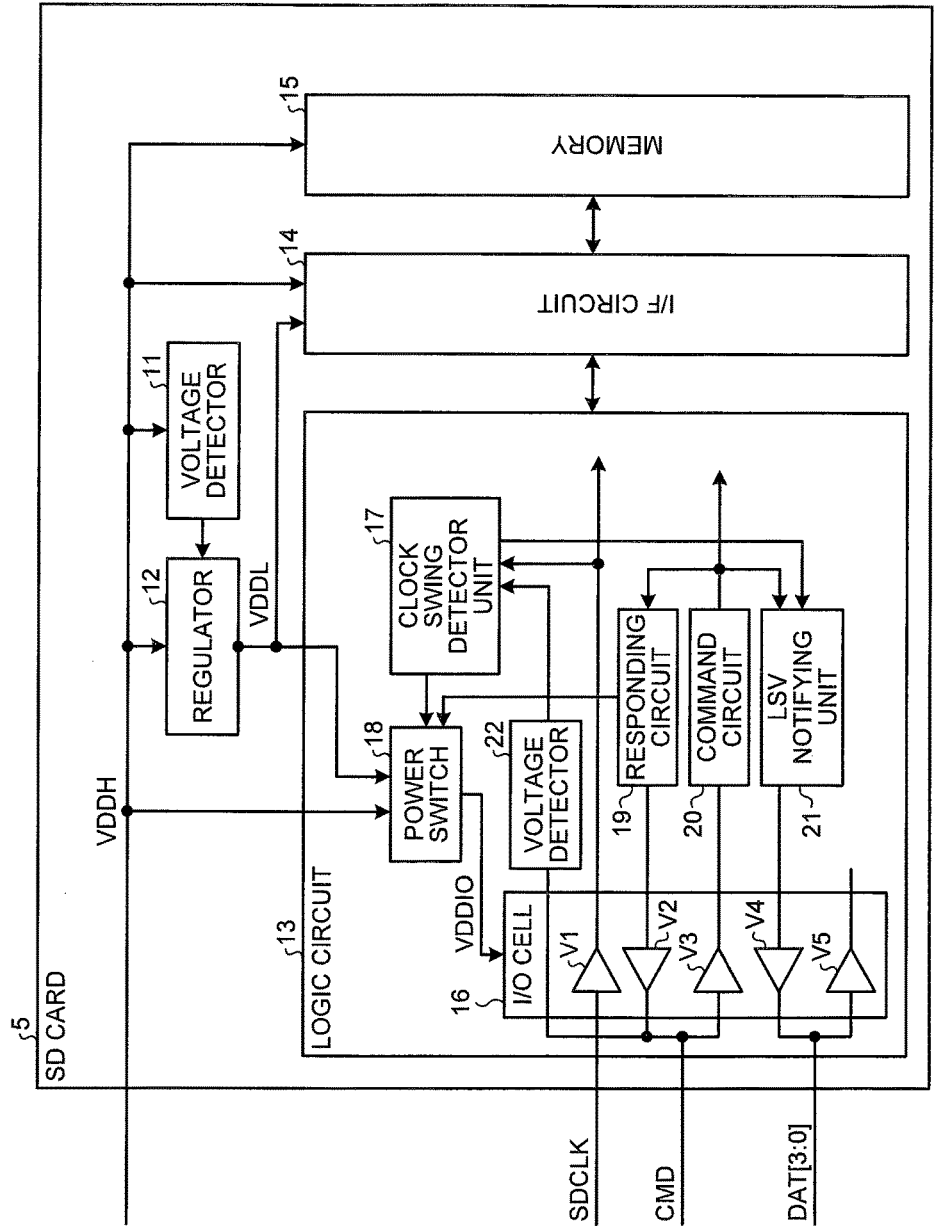
FIG. 25 is a block diagram showing an example configuration of the memory device according to the fifth embodiment.

FIG. 25 is a block diagram showing an example configuration of the memory device according to the fifth embodiment.

Figure 3:
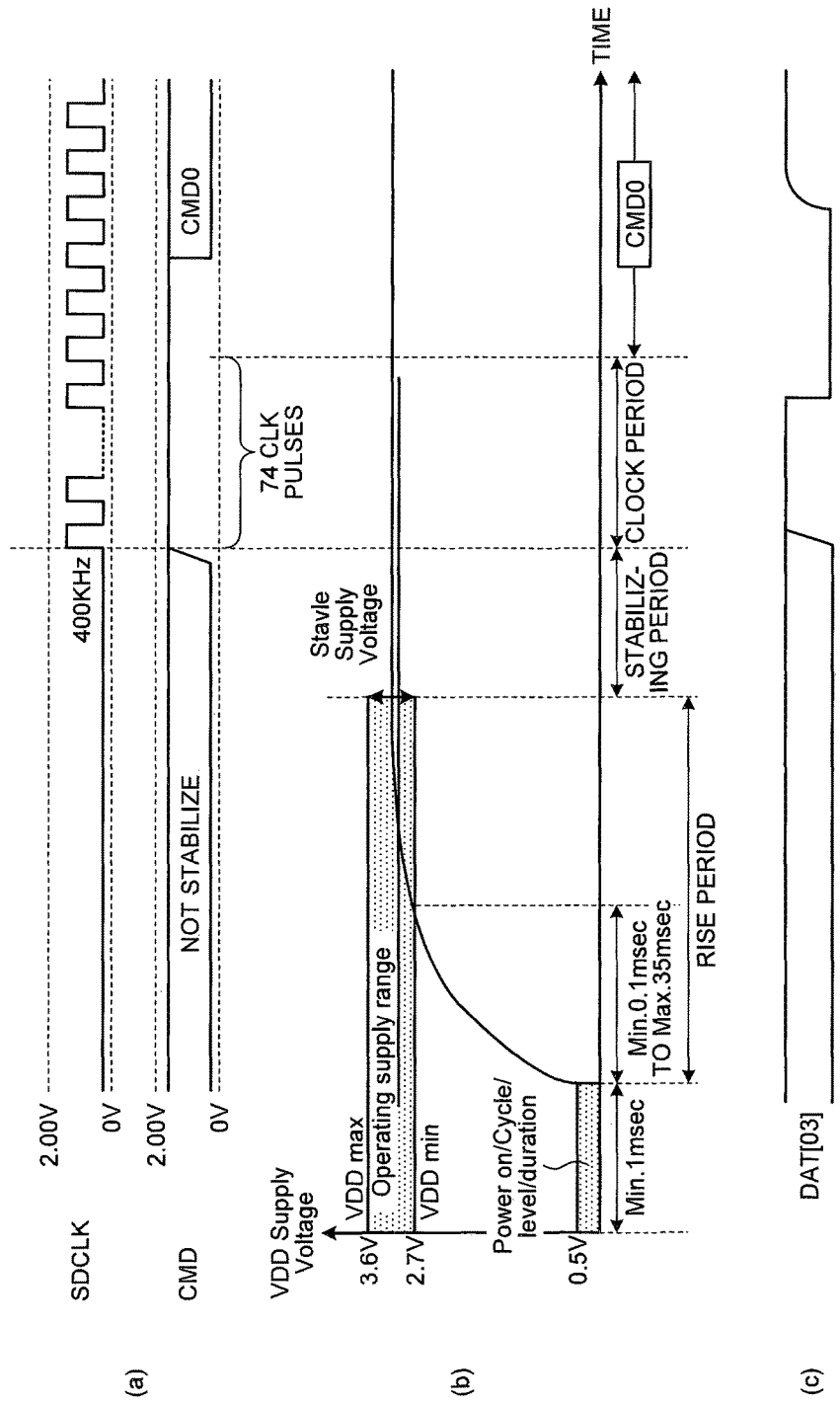
FIG. 3(a) is a timing chart showing the signal waveforms of a clock and a command transmitted to the memory device according to the first embodiment.
FIG. 3(b) is a diagram showing the waveform of the power supply voltage when rising of the memory device according to the first embodiment.
FIG. 3(c) is a diagram showing the waveform of DAT[03] when the memory device according to the first embodiment is receiving a low voltage clock.

The voltage detector can be connected to CMD line as described FIG. 25 as well to measure signal voltage of command line instead of measuring signal voltage of clock line. In this case, Pull-up voltage can be measured on command line. In FIG. 3, command signal voltage is measured during the period of 74 clock pulses and the result is valid by the end of 74 clock pulses period. The result of the voltage detector on command line can be treated like as the result of the voltage detector on clock line in the explained embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An expansion device which is supplied with a power supply voltage from a host and communicates with the host via bus interface signals that are a clock, commands/responses, and data, comprising:
    an I/O circuit including an I/O cell unit that can receive or transmit signals having a first signal voltage or a second signal voltage lower than the first signal voltage,
    wherein the I/O circuit:
        is configured to detect a signal voltage of a clock received from the host to determine which signal voltage between the first signal voltage or the second signal voltage is used by the host, and
        is configured to supply an I/O cell power with a first voltage or a second voltage lower than the first voltage based on the detected signal voltage, the first voltage corresponding to the first signal voltage, the second voltage corresponding to the second signal voltage; and
    wherein the expansion device switches a value of a threshold voltage for determining a logic state of the received signal voltage according to the detected signal voltage, before the I/O cell unit receives command signal from the host,
    wherein until a voltage confirming command is received, the first voltage is supplied to the I/O cell power, and the I/O cell unit is configured to have a specific threshold,
    wherein after the voltage confirming command is received,
    the I/O cell power is selected according to a signal voltage specified by the voltage confirming command,
    and wherein if the first voltage is supplied to the I/O cell power, the I/O cell unit has a threshold for an input signal of the first signal voltage, and the I/O cell unit outputs to the host a signal of the first signal voltage, and if the second voltage is supplied to the I/O cell power, the I/O cell unit has a threshold for an input signal of the second signal voltage, and the I/O cell unit outputs to the host a signal of the second signal voltage.

2. The expansion device according to claim 1,
    wherein until the voltage confirming command is received, the I/O cell power with the first voltage is supplied to the I/O cell unit, and the expansion device switches the value of the threshold voltage for the I/O cell unit to a value according to the detected signal voltage.

3. The expansion device according to claim 2,
    wherein after the voltage confirming command is received, a voltage of the I/O cell power is selected between the first voltage and the second voltage according to a signal voltage specified by the voltage confirming command.

4. The expansion device according to claim 2,
    wherein in response to the I/O cell power with the first voltage being supplied to the I/O cell unit, the expansion device switches the value of the threshold voltages for the I/O cell unit to a first value for the first signal voltage, and
    in response to the I/O cell power with the second voltage being supplied to the I/O cell unit, the expansion device switches the value of the threshold voltages for the I/O cell unit to a second value for the second signal voltage.

5. The expansion device according to claim 2,
    wherein the expansion device receives a voltage identifying command having an argument indicating whether the command signal transmitted by the host is of the first signal voltage or the second signal voltage, and in response to supplying a signal voltage level indicated by the argument, the expansion device selects power supply voltage to the I/O cell power and returns a response having the same signal voltage as the voltage identifying command, and in response to not supporting the signal voltage level indicated by the argument, the expansion device does not return the response.

6. The expansion device according to claim 5, wherein until the voltage confirming command is received, the I/O cell power with the first voltage is supplied to the I/O cell unit to have tolerance to the first voltage, and the expansion device switches, for part of the I/O cell unit, the value of the threshold voltage to the second value for the second signal voltage, and wherein after the voltage confirming command is received, the I/O cell power for the I/O cell unit is selected according to a signal voltage specified by the command signal, and threshold of all inputs and signal voltage for output are determined according to the voltage supplied to I/O cell power.

7. The expansion device according to claim 1, wherein the expansion device can initialize with the second signal voltage alone without using the first signal voltage, the I/O circuit detects a clock oscillation of clock signal provided by the host;

wherein after being supplied with the first voltage, the expansion device starts to drive one of data lines to a low level in response to a detection result of detecting the clock oscillation, and the expansion device stops driving of the data line on receiving a command to indicate to the host that the expansion device can communicate with the second signal voltage alone.

8. The expansion device according to claim 6, wherein the expansion device can initialize with the second signal voltage alone without using the first signal voltage, the I/O circuit detects a clock oscillation of clock signal provided by host, and after being supplied with the first voltage, the expansion device starts to drive one of data lines to a low level in response to a detection result of detecting the clock oscillation, and the expansion device stops driving of the data line on receiving a command to indicate to the host that the expansion device can communicate with the second signal voltage alone.

9. A host apparatus connectable to an expansion device, wherein the host apparatus is configured to supply a power supply to the expansion device, supply a signal to the expansion device, and receive a signal from the expansion device, wherein, when the host apparatus uses a second signal voltage lower than a first signal voltage, the host apparatus sets a signal voltage level based on the second signal voltage, supplies a clock signal having the second signal voltage, issues a command signal having the second signal voltage and incorporates into a field of the command signal a parameter indicating use of the second signal voltage to supply the command signal, receives a response of the command signal and ascertains a support of the signal voltage level based on the response result to the command signal.

10. The host apparatus according to claim 9, wherein, after setting the signal voltage level, the host apparatus waits for a predetermined time until a regulator of the expansion device that generates a second power supply voltage lower than a first power supply voltage from the first power supply voltage becomes stable, before supplying the clock signal having the second signal voltage.

11. The host apparatus according to claim 10, wherein, the host apparatus determines that the expansion device is usable of the second signal voltage if receiving a response to a voltage identifying command having an argument indicating that the second signal voltage is being used, and the host apparatus determines that the expansion device is unusable of the second signal voltage if not having received the response.

12. The host apparatus according to claim 11, wherein the host apparatus comprises a clock supplying unit that supplies the clock using only the second signal voltage as its signal voltage.

13. The host apparatus according to claim 12, wherein the voltage identifying command includes a first combination of arguments, a second combination of arguments, or a third combination of arguments, the first combination of arguments include:
an argument indicating the first power supply voltage; and
an argument indicating the first signal voltage; the second combination of arguments include:
an argument indicating the first power supply voltage; and
an argument indicating the second signal voltage; the third combination of arguments include:
an argument indicating the second power supply voltage; and
an argument indicating the second signal voltage; and the host apparatus supplies the same power supply voltage as indicated by the argument of the voltage identifying command to the expansion device and supplies the clock and commands having the same signal voltage as indicated by the argument.

14. The host apparatus according to claim 13, wherein when supplying the clock and command having the second signal voltage, if receiving a response having the second signal voltage, the host apparatus determines that the expansion device is usable of the second signal voltage, and when supplying the clock and command having the second signal voltage, if not having received a response to the voltage identifying command, the host apparatus determines that the expansion device is unusable of the second signal voltage.

15. A method of controlling a host apparatus, the method comprising:

supplying a power supply to an expansion device;
supplying a signal to the expansion device; and
receiving a signal from the expansion device,
wherein the supplying a signal includes, when the host apparatus uses a second signal voltage lower than a first signal voltage, setting a signal voltage level based on the second signal voltage,
supplying a clock signal having the second signal voltage,
issuing a command signal having the second signal voltage, and
incorporating into a field of the command signal a parameter indicating use of the second signal voltage to supply the command signal;

the receiving a signal includes:
  receiving a response of the command signal, and
  ascertaining a support of the signal voltage level based on the response result to the command signal.

16. The method according to claim 15, further comprising:
  after setting the signal voltage level, waiting for a predetermined time until a regulator of the expansion device that generates a second power supply voltage lower than a first power supply voltage from the first power supply voltage becomes stable, before supplying the clock signal having the second signal voltage.

17. The method according to claim 16, further comprising:
  determining that the expansion device is usable of the second signal voltage if receiving a response to a voltage identifying command having an argument indicating that the second signal voltage is being used; and
  determining that the expansion device is usable of the second signal voltage if not having received the response.

18. The method according to claim 17,
  wherein the supplied clock signal uses only the second signal voltage as its signal voltage.

19. The method according to claim 18,
  wherein the voltage identifying command includes a first combination of arguments, a second combination of arguments, or a third combination of arguments,
  the first combination of arguments include:
    an argument indicating the first power supply voltage; and
    an argument indicating the first signal voltage; the second combination of arguments include:
    an argument indicating the first power supply voltage; and
    an argument indicating the second signal voltage; the third combination of arguments include:
    an argument indicating the second power supply voltage; and
    an argument indicating the second signal voltage; and
  the method further comprises supplying the same power supply voltage as indicated by the argument of the voltage identifying command to the expansion device and supplying the clock signal and commands having the same signal voltage as indicated by the argument.

20. The method according to claim 19, further comprising:
  determining, when supplying the clock signal and command having the second signal voltage, if receiving a response having the second signal voltage, that the expansion device is usable of the second signal voltage; and
  determining, when supplying the clock signal and command having the second signal voltage, if not having received a response to the voltage identifying command, that the expansion device is unusable of the second signal voltage.

* * * * *